US006393478B1

United States Patent
Bahlmann

(10) Patent No.: US 6,393,478 B1
(45) Date of Patent: May 21, 2002

(54) CABLE MODEM AND PERSONAL COMPUTER TROUBLESHOOTING TOOL

(75) Inventor: Bruce F. Bahlmann, White Bear Lake, MN (US)

(73) Assignee: MediaOne Group, Inc., Englewood, CO (US)

( * ) Notice: Subject to any disclaimer, the term of this patent is extended or adjusted under 35 U.S.C. 154(b) by 0 days.

(21) Appl. No.: 09/255,104

(22) Filed: Feb. 22, 1999

(51) Int. Cl.[7] .............................................. G06F 17/00
(52) U.S. Cl. ...................... 709/224; 709/225; 713/200; 713/201; 714/4
(58) Field of Search ........................ 713/200; 113/201; 714/4; 709/224, 225

(56) References Cited

U.S. PATENT DOCUMENTS 5,838,919 A * 11/1998 Schwaller et al. .......... 709/224
5,881,237 A * 3/1999 Schwaller et al. .......... 709/224
5,937,165 A * 8/1999 Schwaller et al. .......... 709/224
6,061,725 A * 5/2000 Schwaller et al. .......... 709/224

* cited by examiner

Primary Examiner—Ly V. Hua
(74) Attorney, Agent, or Firm—Brooks & Kushman P.C.

(57) ABSTRACT

A system and method for troubleshooting devices on a network where each device is identifiable by a medium access control address. Personnel interact with the system from a browser using hypertext markup language pages. A search capability allows the personnel to find a particular device based upon its medium access control address, and display device specific data. The device specific data is kept in a database internal to the system. Update functions are provided to change the data in the internal database. Utility functions are also provided to aid in troubleshooting, maintenance, and verification. The functions include clearing the device's packet errors, viewing the device's bridging table and history logs, registering and de-registering the device with a provisioning server, changing address filter and port filters, invoking a software reset and software download, looking up the device's hostname, and searching the provisioning server's log files for transactions involving the device.

53 Claims, 35 Drawing Sheets

Bridging Table

The following mac addresses were found in the forwarding table
Select ONE of the following to retrieve information.

| Ethernet Side:4 | CATV Side:38 |
|---|---|
| 00:00:ca:05:0d:00 | 00:00:ca:03:f5:75 |
| 00:60:08:98:11:b4 | 00:00:ca:03:f5:76 |
| 00:60:08:c5:04:27 | 00:00:ca:05:0d:00 |
| 00:aa:00:33:99:6f | 00:00:ca:09:9e:14 |
|  | 00:00:ca:05:a9:29 |
|  | 00:00:ca:05:a9:2a |
|  | 00:00:ca:05:d3:ce |
|  | 00:00:ca:05:f9:2b |
|  | 00:00:ca:06:0c:ba |
|  | 00:00:ca:06:b0:31 |
|  | 00:00:ca:06:b0:32 |
|  | 00:00:ca:07:a6:7f |
|  | 00:00:ca:07:a6:80 |
|  | 00:00:ca:07:ac:d3 |
|  | 00:00:ca:07:ac:d4 |

The bridging table is a dynamic area in each modem that contains mac addresses from modems and PCs that the bridge has recently learned. The current time-out for the bridge is 300 seconds which means that if one of the current entries does not communicate during the 300 second window its entry will fall out of the table. If one communicates with the device (e.g. ping) it should (re) enter the table. Note that if two similar mac addresses show up in the table as below:

00:00:ca:03:60:49
00:00:ca:03:60:50 <--- correct mac

The valid mac address will be the larger one.

[Lookup] [Clear] Version: 1.70

*Fig. 7*

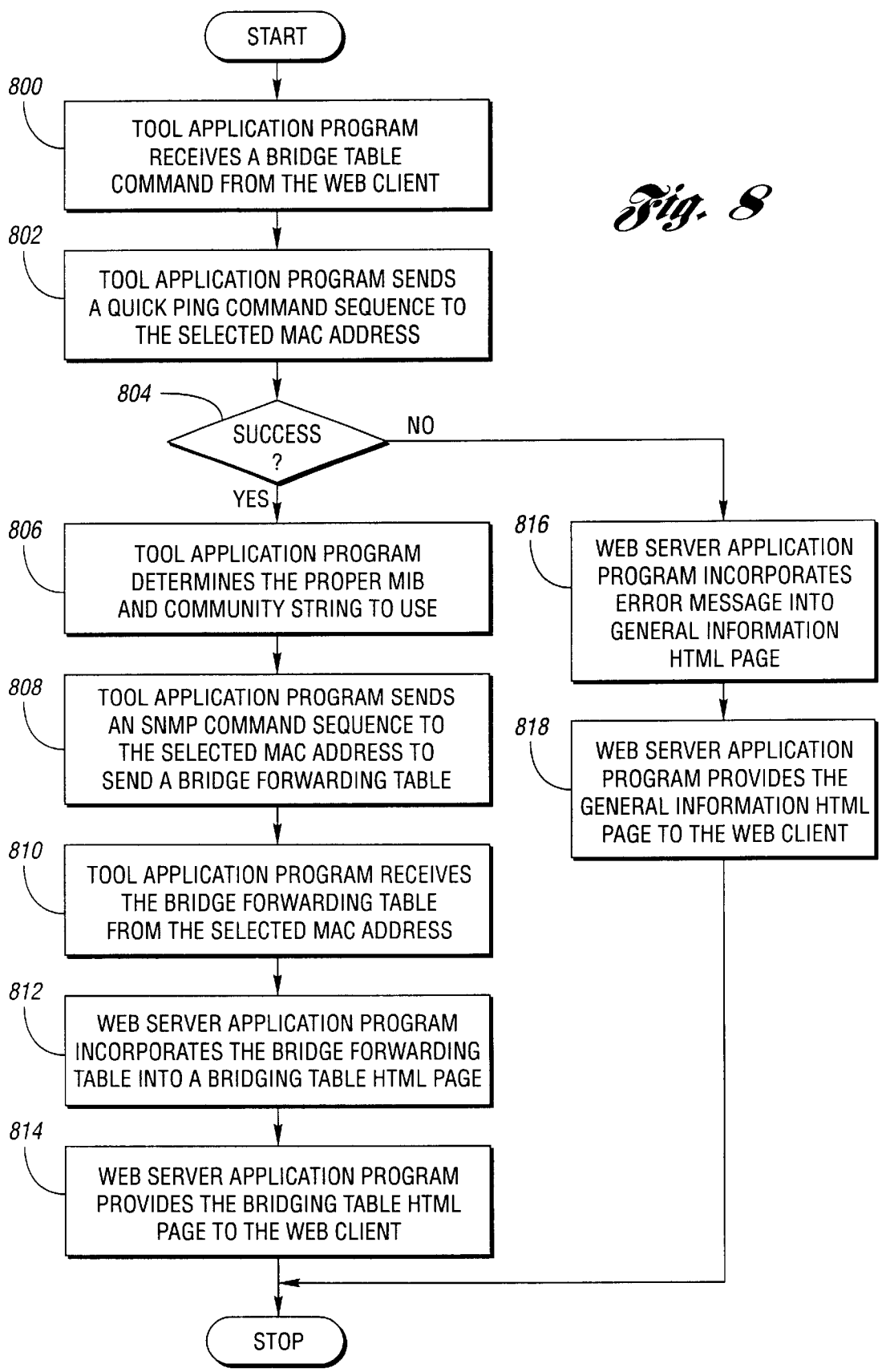

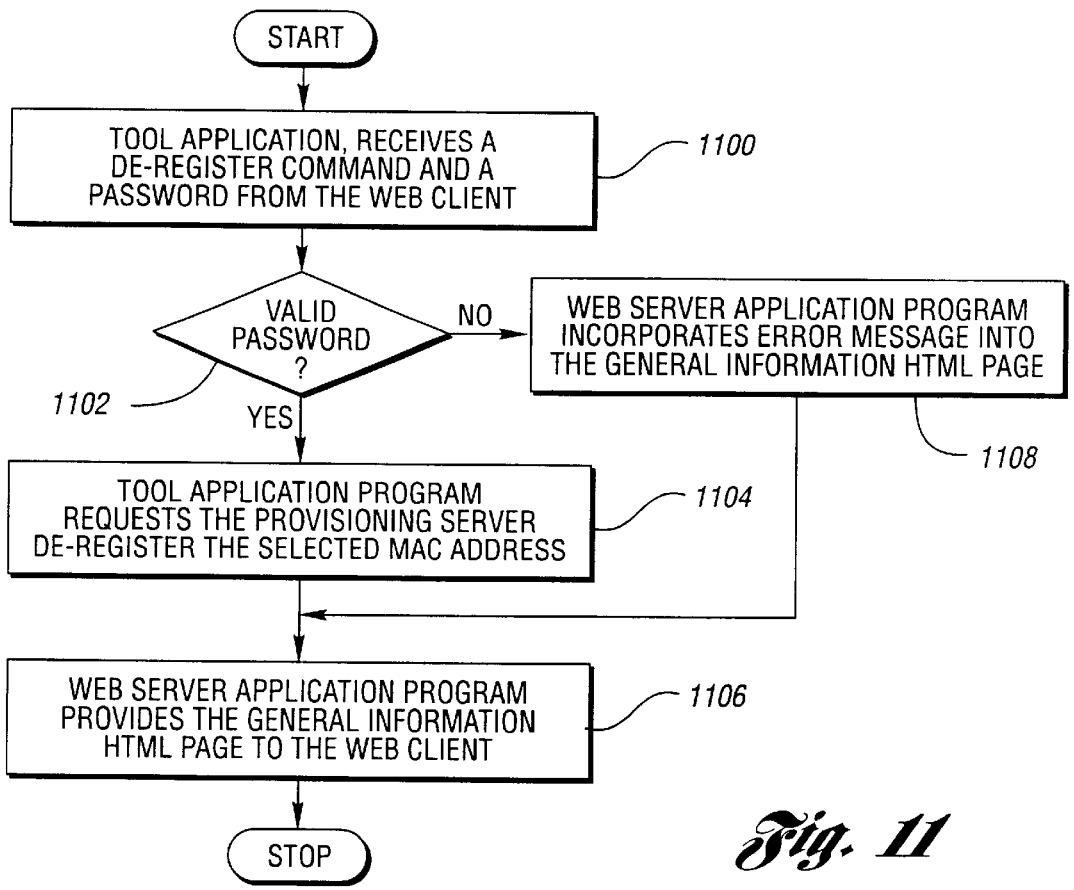

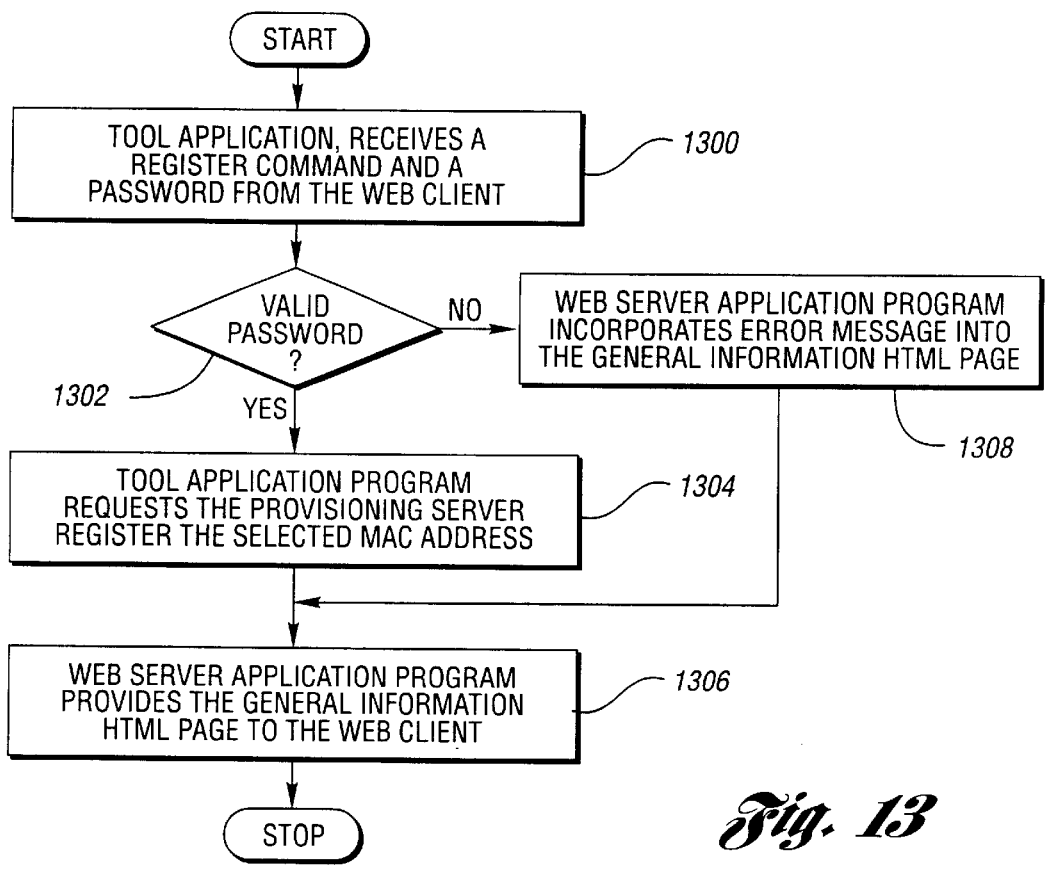

Address Filter Modification:

For cable modem 00:00:ca:03:61:84 at 10.128.44.51

This utility will enable various IP address filters on a cable modems. The values in the table below represent the current IP address filter setting (they were just read by this page). To set these filters choose one of the two options (Note EZ Set overrides manual settings):
1) Select one of the filter options in EZ Set ant click the button Set Address Filter(s)
2) Set the filters manually and click the button. Set Address Filter(s)

EZ SET *******************************************************
Use Manual Set ○
24Net Isolation ● Isolate to 24.[128].0.0 --- Required for 24Net Isolation
Clear All Filters ○

Manual SET *****************************************************

Address Filtering On/Off: ☒

| Filter Number | #1 | #2 | #3(24Net Isolation) |
|---|---|---|---|
| Status (active?): | ☐ | ☐ | ☒ |
| Interface: | ▶ | ▶ | Either ▶ |
| DA: | 0.0.0.0 | 0.0.0.0 | 24.128.0.0 |
| DA Mask: | 0.0.0.0 | 0.0.0.0 | 255.255.0.0 |
| SA: | 0.0.0.0 | 0.0.0.0 | 24.128.0.0 |
| SA Mask: | 0.0.0.0 | 0.0.0.0 | 255.255.0.0 |
| Action: | pass ▶ | pass ▶ | pass ▶ |

[ Back to Display ] [ New Search ] [ Set Address Filter(s) ]

*Fig. 14*

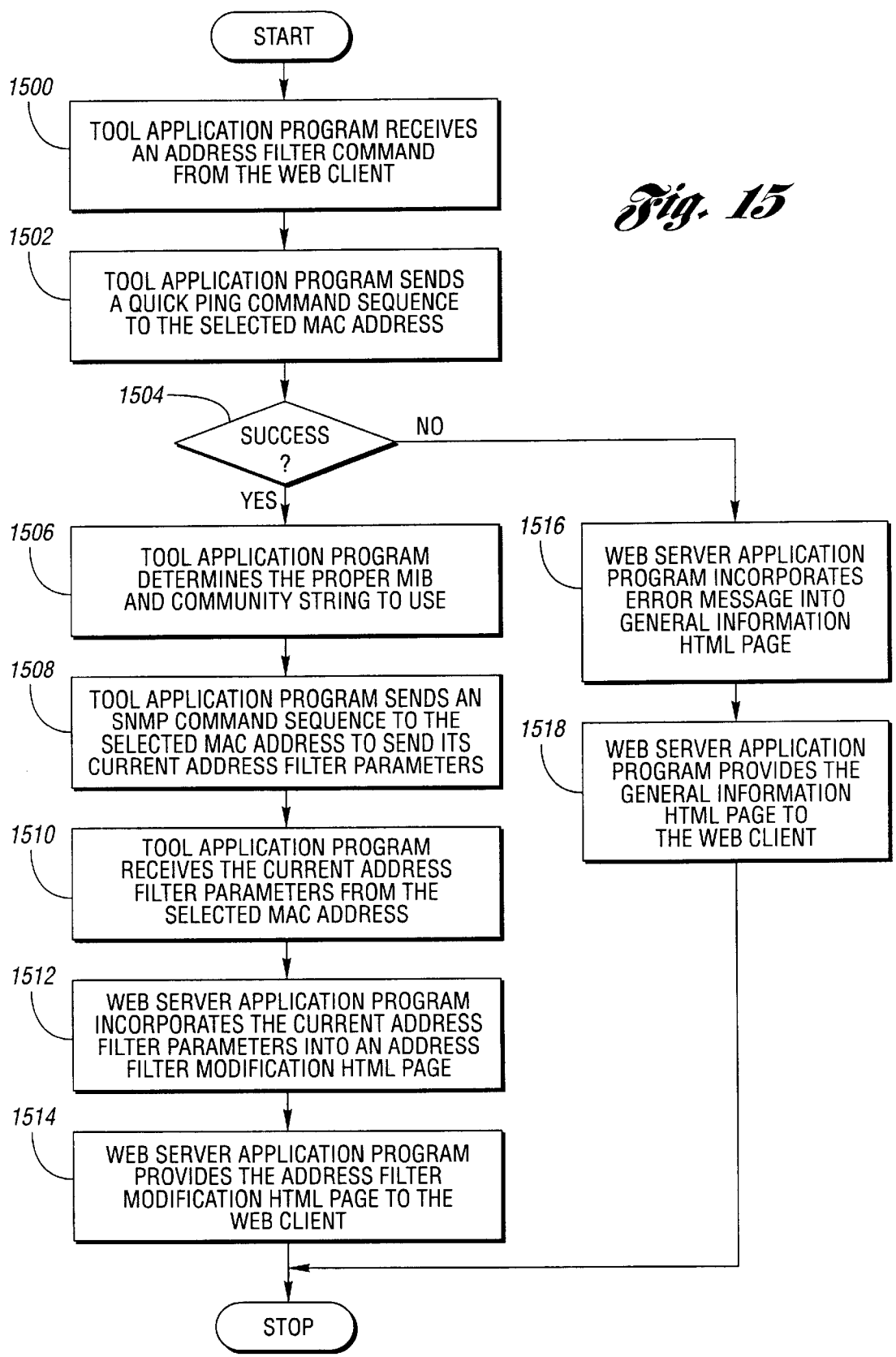

*Fig. 19*

The bottom of this page has instructions on the use of LISTEN:

Listening to Device at:
ip address = 10.128.44.51 mac address = 00:00:ca:03:61:84

DHCP Server Traffic = 1 packet(s)
========================================
871663282.529886 Packet arrived on Friday August 15 12:41:22 received on address 24.128.1.34
xid=0x846103ce secs=17 flags=0x2c06
chaddr: 00:00:ca:03:61:84
unpacked payload:
ht=1:ha=00.00.ca.03.61.84:ci=0.0.0.0=gi=24.128.44.1:sa=0.0.0.0:yi=0.0.0.0:flags=513,514,515,523,524,525:vm=rfc1048:

unregistered host=<00:00:ca:03:61:84> sending dynamic BOOTP -- ignored  ← 1904
BOOTP Server Traffic = 1 packet(s)
========================================
871663282.249390 Packet arrived on Friday August 15 12:42:03 received on address 24.128.1.92
xid=0x846103ce secs=17 flags=0x2c06
chaddr: 00:00:ca:03:61:84
unpacked payload:
ht=1:ha=00.00.ca.03.61.84:ci=0.0.0.0=gi=24.128.44.1:sa=0.0.0.0:yi=0.0.0.0:flags=513,514,515,523,524,525:vm=rfc1048:

seeking BOOTP client (1,6,00:00:ca:03:61:84) on subnet 24.128.44.0
BOOTP packet from <00:00:ca:03:61:84> configured with <0.0.0.0>

Reply Host structure:  ← 1902
ht=1:ha=00.00.ca.03.61.84:ci=0.0.0.0=gi=24.128.44.1:sa=24.128.1.92ysi=10.128.44.51:flags=1,3,6,7,13,15,66,67,513,514,515,520
24.128.52.6 24.128.1.80:lg=0.0.0.0:bs=1:dn=ne.mediaone.net:sn=chdhcp02:bf=/usr/tftp/zionhill/24.128.44.0/basic:

[Back to Display] [New Search] [Listen Again]

*1900*

NSLookup for IP address [24.128.44.138] — 2104a
Server: chnms01.mediaone.net
Address: 10.128.1.80
Name: bahlmann.ne.mediaone.net — 2102
Address: 24.128.44.138 — 2104b
} 2100

| Server Data: | | Owner Data: | | Health Data: | |
|---|---|---|---|---|---|
| Add. Type | 0.00 hrs old | FirstName | 10 days old | Tx Freq. | 9 days old |
| Mac Add. | dynamic | LastName | BRUCE | Rx Freq. | 26.75 MHz |
| IP Add. | 00:00:ca:03:61:84 | Address | BAHLMANN | Tx Powr. | 543 MHz |
| Start Lease | 10.128.44.51 | City | 243 SouthStreet | Rx Level | 48.56 Db |
| Lease Exp. | Mon Jun 16 17:37:24 1997 | Fiber Node | READINGMA | Min Rx since bs | Calibrated |
| Lease Ext. | Mon Jan 18 22:14:07 2038 | Phone | 6 | Ave Rx since bs | +07.52 dB |
| Last trans. | Mon Jun 16 17:37:24 1997 | PC Mac | 781-9444329 | Uptime | +10.98 dB |
| | Fri Feb 27 09:14:29 1998 | Modem Mac | 00:a0:24:90:cf:22 | HE Node | 2:45:09 |
| | | Email | 00:00:ca:03:61:84 | HE Node IP | MA-reading-6 |
| | | | bahlmann | Rx/Ex Fig. | 10.128.44.30 |
| Device Spec. | | | | Serial num. | 7\7 |
| Registered | Yes (BOOTP) | | | Headend | 62704760 |
| Alive? | 4.00_LCp | | | Tot.UL Pkts | zionhill |
| | Yes | | | Pkts/error | 90 |
| | | | | | 0 |

[Reg.] [DeReg] [Update Server] [Update Owner] [Ping] [Listen]
[New Search] [NS lookup]

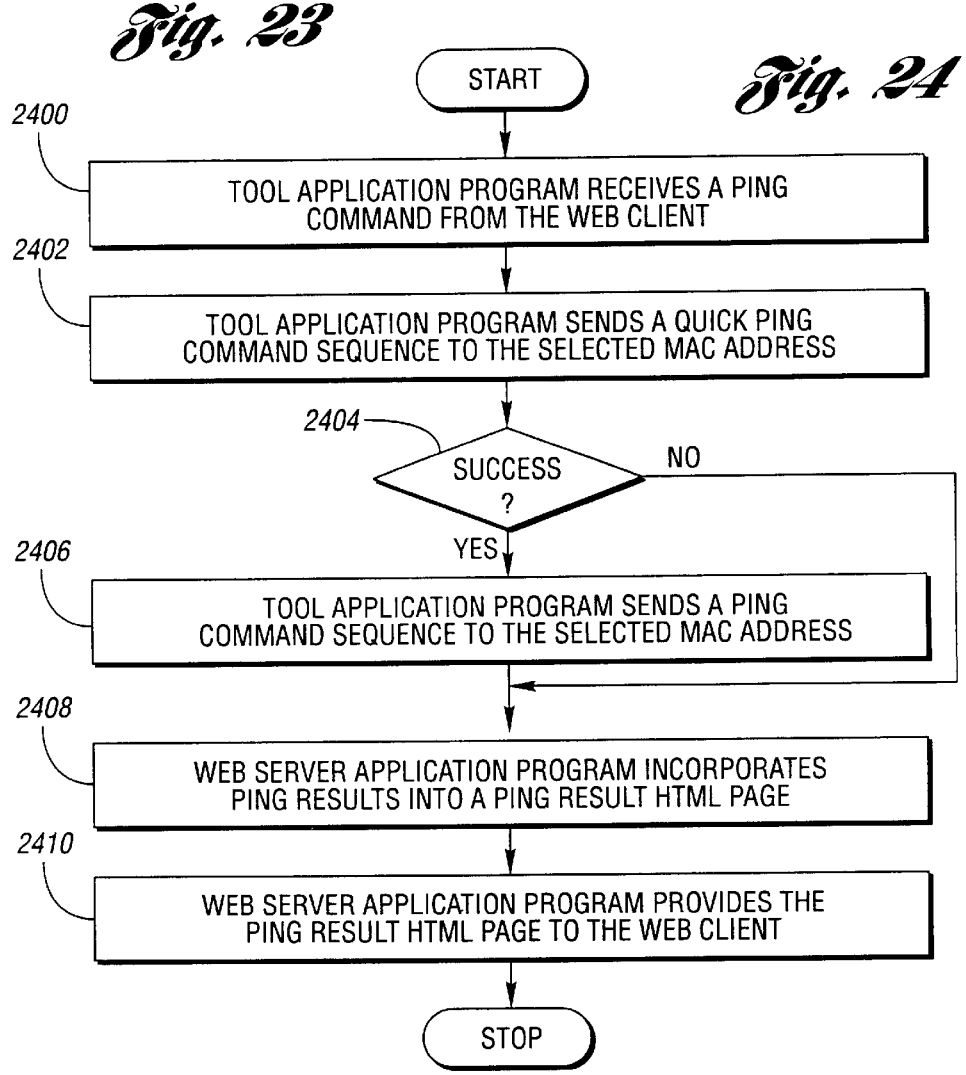

Fig. 25

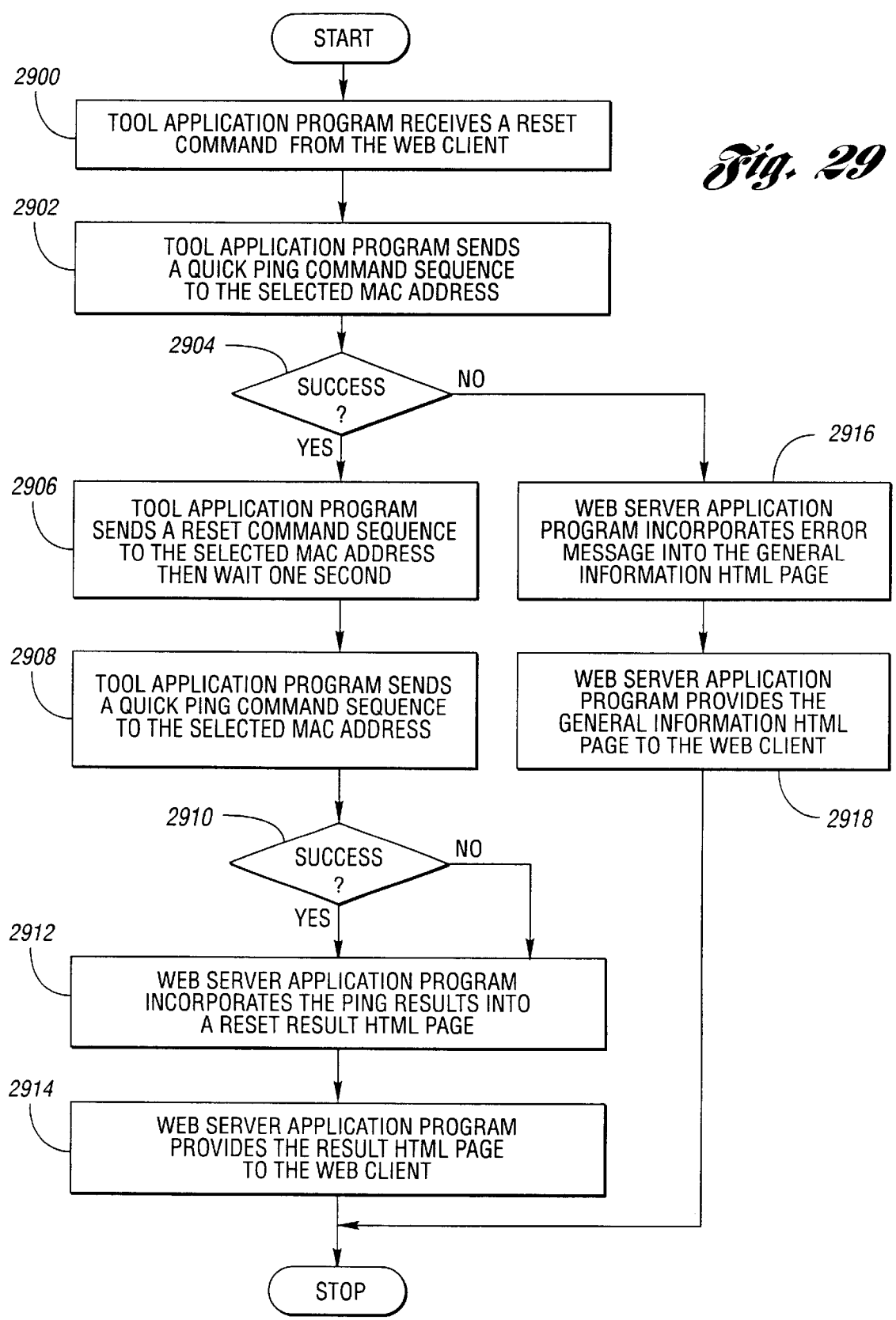

Upgrade Modem Software:

Upgrading a modem can take up to 10 minutes and during this time the modem will be OFFLINE. There is always the possibility that during this download the modem could fail to completely receive the TFTP file. If this happens, the modem will not be able to reboot and will need to be replaced. The major cause of failed downloads is poor return plant.

ip address = 24.128.36.13
mac address = 00:00:ca:03:27:3a

The following configurations were selected for this modem: These should be correct!

TFTP Server Address: [ 24.128.1.34 ]
Gateway Address: [ 24.128.36.1 ]
Download File: [ LCB310.FTP ]
Password: [ ]

Needed to upgrade LChs!

[ Back to Display ]   [ New Search ]   [ Upgrade Modem ]

*Fig. 30*

Modem History Log

The following is a log of the last 6 events recorded in the modem history log. Entries in this log represent key events (good or bad) in modem operation. An index of the error entries will be assembled at the bottom of this page.

| Index | First Time | Last Time | Count | Level | ErrorID | ModID |
|-------|------------|-----------|-------|-------|---------|-------|

[Back to Display]  [New Search]  [Reset log]

Index      Specifies the index of this entry in the field support history log
First Time The date and time that the first log entry of this type was created
Last time  The date and time that the last log entry of this type was created
Count      The number of times this event was repeated consecutively
Level      Type of entry
ErrorID    An identifier of the specific event that was logged
ModID      The software module responsible for reporting the event

Fig. 33

|  |  |  |  |
|---|---|---|---|
| Server Data: Add. Type Mac Add. IP Add. Start Lease Lease Exp. Lease Ext. Last trans. Device Spec. Registered Alive? ⟵3806 | 72 days old dynamic 00:a0:24:90:cf:22 24.128.44.138 Mon Jun 2 21:28:50 1997 Wed Jun 2 21:28:50 1997 Tue Jun 3 00: 28:50 1997 Mon Jun 2 21:28:50 1997  Yes No | Owner Data: FirstName LastName Address City Fiber Node Phone Host name PC Mac Modem Mac Email | 64 days old Bruce Bahlmann 243 SouthStreet Reading 6 617-7203078 bahlmann 00:a0:24:90:cf:22 00:00:ca:03:61:84 bahlmann |

3802 / 3804

[ Update Server ] [ Update Owner ] [ Ping ] [ Listen ] [ Reg ] [ DeReg ]
[ New Search ]

*Fig. 38* — 3800

|  |  |  |  |
|---|---|---|---|
| Server Data: Add. Type Mac Add. IP Add. Class Headend Bootfile Fiber Node Device Spec. Registered Version Alive? | 0.00 hrs old static 00:00:ca:03:29:40 10.128.44.30 node zionhill headend reading_6   Yes (BOOTP) 3.12_LCh No | Health Data: Tx Freq. Rx Freq. Tx Powr. Rx Level Min Rx since bs Ave Rx since bs Uptime HE Node HE Node IP Rx/Ex Fig. Serial num. Headend Tot.UL Pkts Pkts/error | 5 days old 26.75 MHz 543 MHz 55.98 Db Calibrated -03.28 dB -02.52 dB 0:43:47 MA-reading-6 10.128.44.30 0\0 61108840 zionhill 241605 0 |

4202 / 4204

[ Update Server ] [ Update Health ]
[ Bridging Table ] [ Clear Errors ] [ History ] [ IP Filter ] [ Port Filter ] [ Ping ] [ Listen ]
[ New Search ]

*Fig. 42* — 4200

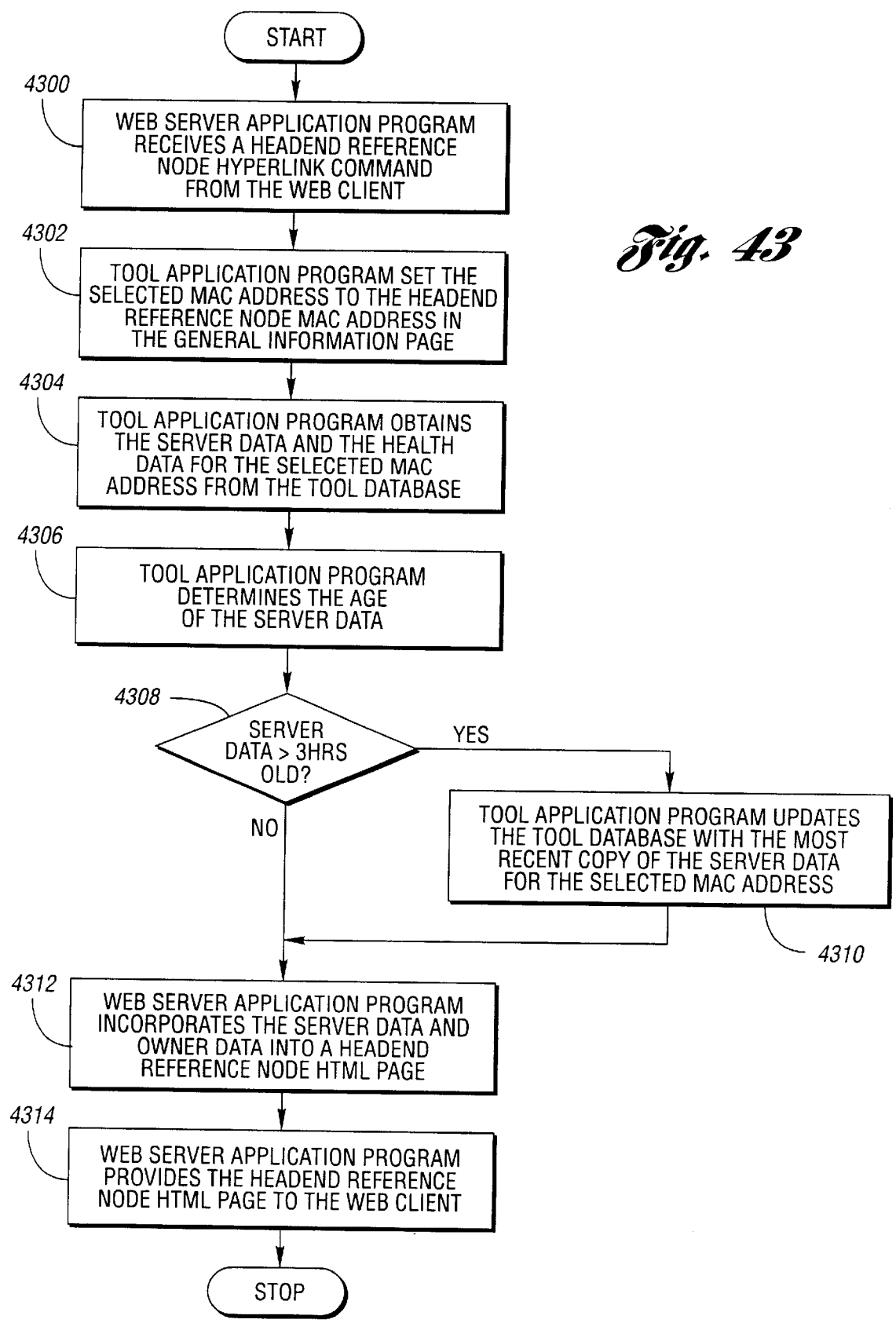

CABLE MODEM AND PERSONAL COMPUTER TROUBLESHOOTING TOOL

TECHNICAL FIELD

The present invention relates to the field of web-based systems and methods for troubleshooting devices on a network.

BACKGROUND ART

Networks vary in scope from simple arrangements that connect a personal computer to a printer and external modem within the same room, to complex system that cover cities, regions and entire countries. As the complexity of a network increases, it is often broken down into segments and sub-networks linked together by routers, bridging circuits, switchers and headends. Each of these segments and sub-networks may operate with a different set of protocols such as the Transmission Control Protocol/Internet Protocol (TCP/IP), Open Systems Interconnection protocol, Apple Talk, Novell NetWare, or the IBM System Network Architecture. Various servers are found throughout the network to provide data, communications, security, and other services to clients on the networks and sub-networks. The clients interface to the network through one or more of several different devices. Individual clients have traditionally used internal and external modems to access the network via telephone lines. Larger clients typically have their own local area network linking each computer's network interface card. A relatively new network interface device is a cable modem that uses cable television coax cable as the physical medium to communicate. Consequently, network providers must manage many different types of devices interconnected by a variety of networks, network segments and sub-networks and communicating with multiple protocols.

The increased popularity of the Internet has resulted in a widespread use of the TCP/IP for intra-network and inter-network communications. Using TCP/IP, each device on a network has a unique Internet Protocol (IP) address. Permanent, full time devices such as servers, routers, and headend nodes are assigned a unique static IP address. Mobile and part-time devices such as desktop and laptop personal computers are assigned a dynamic IP address from a pool of addresses when they first log onto a network. When the lease for a dynamic IP address expires, that IP address is returned to the pool of addresses where it is available for assignment to another device.

Use of dynamic IP addressing has advantages and disadvantages for support, operations and maintenance personnel. Dynamic IP addressing is an advantage for network configuration management. As new devices are added to a network, old devices are removed, and existing devices log on and log off different networks, the assignment of the IP addresses is handled automatically by the provisioning server application software—no manual reconfiguration is required. Dynamic IP addressing creates a disadvantage for searching, troubleshooting and verification activities because a key piece of information, the IP address itself, changes from time to time.

Once a desired device has been found on the network, troubleshooting, correction, and verification can be performed. Information necessary for these tasks is typically scattered in multiple authoritative sources such as the provisioning servers, application servers, directory servers, billing data bases, and trouble ticketing data bases. Personnel require access to multiple individual accounts on mission critical servers to obtain all of this information. Personnel also desire utilities to communicate with the desired device over the network since the desired device is often in a remote physical location. An example of one such utility is "ping." The ping function sends an Internet Control Message Protocol echo request command to the selected device. If the selected device is reachable, then an echo will be generated in response to the ping command. If no echo is received within a set time then the selected device is unreachable. An ability to troubleshoot, correct, and verify problems over the network from some central location saves considerable time and money compared to sending personnel to the devices in the field.

What is desired is an integrated tool that allows personnel to search for devices on the network, and to gather and display data associated with the selected device from the different databases and reports that are available on the network. It is also desirable for the integrated tool to contain embedded utilities that allow personnel to communicate with the devices, ask them for current parameters, send them new parameters, execute remote procedure calls, and even download software upgrades. The tool should also be portable so that personnel in the field can verify repairs and new installations from the field.

DISCLOSURE OF INVENTION

The present invention is a system and method for troubleshooting devices on a network where each device on the network is identifiable by a medium access control (MAC) address. Personnel interact with the system from a web browser using hypertext markup language (HTML) pages. A search capability allows the personnel to find a selected device based upon its MAC address, and display device specific data. The device specific data is maintained in a database internal to the system. Network configuration data is available from an external database. Update functions are provided to change the data in the internal database.

A suite of utility functions is also provided to aid in troubleshooting, maintenance, and verification. Communication between the system and devices is accomplished using the Simple Network Management Protocol. A Bridging Table function returns a listing of addresses that the device has learned on each of its ports. A Clear Error function clears the device's packet error count. Register and De-register functions cause the device to be registered and de-registered respectively with a provisioning server. An Internet Protocol (IP) Address Filter function changes the device's address filtering parameters. A Listen function reads the log file of the provisioning server and reports any packets containing the MAC address of the selected device. A Name Sever Lookup function provides the hostname for the selected device. The Ping function checks if a device is reachable. A Port Filter function changes the device's port filter parameters. A Reset function causes a software reset on the selected device. An Upgrade function invokes a software download. Finally, a History function reads the device's log file and displays the last couple of transactions.

Hyperlinks in the HTML pages are provided as a convenient way for the personnel to navigate to data associated with the selected device. A Personal Computer hyperlink is generally available when general information about a customer's cable modem is displayed. This hyperlink jumps to a general information page containing data about the customer's personal computer. A headend reference node hyperlink jumps to an information page containing data about the headend reference node associated with the customer's cable modem. Finally, an e-mail hyperlink allows a customer to be e-mailed from the system.

Accordingly, it is an object of the present invention to provide a system that enables a web client on a network to troubleshoot multiple MAC addresses on the network.

Another object it to provide a computer having an interface to the network.

Another object is to provide a tool database that stores server data, owner data and health data for each MAC address.

Another object is to provide a web server application program that provides a set of standard protocols to facilitate communications. The web server application program also stores a most recent copy of the owner data supplied by periodic reports available on the network, and stores a most recent copy of the server data supplied by the provisioning servers.

Another object is to provide a tool application program that communicates with the tool database, the web client, provisioning servers on the network, and a headend database. When the web client enters one or more search parameters, the tool application program searches the tool database and a headend database for a match. Next the tool application program identifies a selected MAC address for the match, and provides the web client with a general information page containing the server data, owner data, and health data for the selected MAC address. When the web client enters an update health command, the tool application program obtains the current health parameters from the selected MAC address. When the web client enters an update owner command, the tool application program writes the most recent copy of the owner data stored by the web server application program into the tool database. When the web client enters an update server command, the tool application program writes the most recent copy of the server data stored by the web server application program into the tool database.

Yet another object of the present invention is to provide a method for a web client on a network to troubleshoot multiple MAC addresses on the network.

Another object is to provide storage of health data, owner data, and server data in a tool database.

Another object is to provide searching of the tool database and a headend database for a match to one or more search parameters entered by the web client. The match identifies a selected MAC address.

Another object is to provide a general information page to the web client containing the server data, owner data, and health data for the selected MAC address.

Another object is to obtain new health parameters from the selected MAC address and write them into the tool database.

Another object is to receive a most recent copy of the owner data from periodic reports available on the network, and to write it into the tool database.

Another object is to receive a most recent copy of the server data from the provisioning servers, and to write it into the tool database.

These and other objects, features and advantages will be readily apparent upon consideration of the following detailed description in conjunction with the accompanying drawings.

BRIEF DESCRIPTION OF DRAWINGS

FIG. 7 is an example of a bridging table page display;

FIG. 8 is a flow diagram of a bridging table command function;

FIG. 10 is an example of a de-register page display;

FIG. 11 is a flow diagram of a de-register command function;

FIG. 12 is an example of a register page display;

FIG. 13 is a flow diagram of a register command function;

FIG. 14 is an example of an address filter page display;

FIG. 15 is a flow diagram for displaying current address filter parameters;

FIG. 19 is an example of a listen page display;

FIG. 21 is an example of a name server lookup page display;

FIG. 23 is an example of a ping result page display;

FIG. 24 is a flow diagram of a ping command function;

FIG. 25 example of a port filter page display;

FIG. 29 is a flow diagram of a reset command function;

FIG. 30 is an example of an upgrade page display;

FIG. 33 is an example of a history page display;

FIG. 38 is an example of a personal computer general information page display;

FIG. 42 is an example of a headend reference node page display; and

FIG. 43 is a flow diagram of a headend reference node command function.

BEST MODE FOR CARRYING OUT THE INVENTION

The present invention is a web-based troubleshooting tool (WBTT) that serves multiple constituencies in the management of a network. The operations staff uses the WBTT to verify working status or problems in the network and escalate trouble tickets appropriately. (A trouble ticket is a report used to track problems with the network or network services.) Plant operations personnel use the WBTT to verify customer and headend modem operations and troubleshoot return problems. The technical support specialists use the WBTT to detect problems with customer's personal computers and cable modems, troubleshoot, and verify corrections. Field technicians use the WBTT to complete installations, upgrade modems, apply filters, troubleshoot problems, verify radio frequency levels for Data Over Cable Service Interface Specifications devices, and streamline the process of servicing trouble tickets. This tool gathers and consolidates information belonging to various sources speeding the time required to troubleshoot problems while eliminating the need for multiple individuals to have access to mission critical servers.

The WBTT consists of several components. A host computer, such as a SUN Solaris workstation, is host to the software applications. A tool application program performs tasks at the request of a web client. A web server application program facilitates network based communications for the tool application program. Gathered data about the various devices on the network is stored in a tool database. Global parameters are held in a configuration file. A shell script interfaces the tool application program to the web server application program. Finally, a web browser provides the input and output for the web client.

An Internet Architecture Board (IAB) defines the Internet standards used below in Standard protocols (STD) and Request For Comments (RFC) documents.

Figure 1:
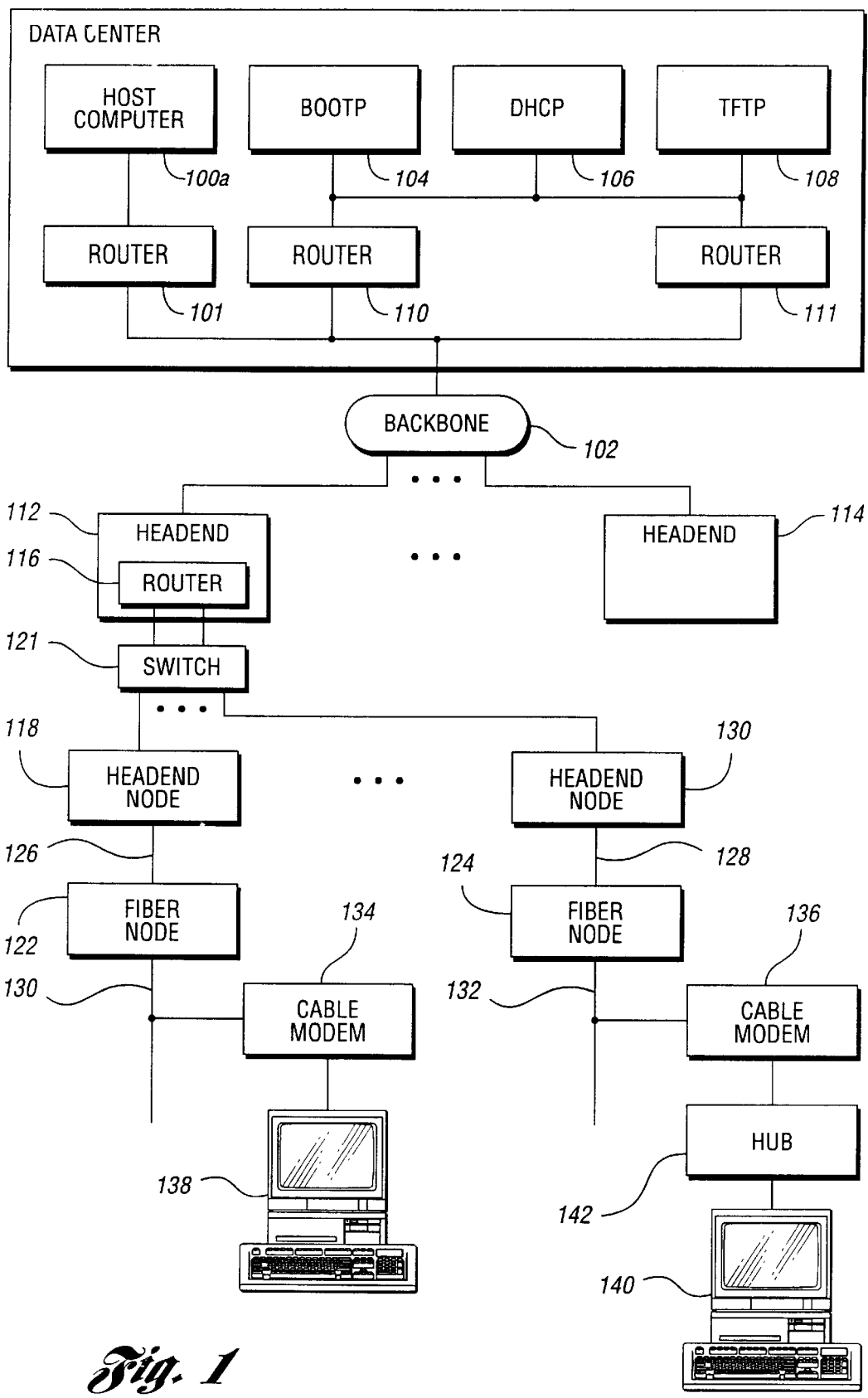
FIG. 1 is a hardware block diagram of the present invention connected to a typical network.

FIG. 1 is a block diagram of the present invention connected to a typical network. The web-based troubleshooting tool hardware, a host computer 100a, is connected through a router 101 to the backbone network 102. A variety of servers, including Bootstrap Protocol (BOOTP)(IAB draft standard protocol RFC 2131) server 104, a Dynamic Host Configuration Protocol (DHCP)(IAB draft standard protocol RFC 2132) server 106, and a Trivial File Transfer Protocol (TFTP)(IAB standard protocol STD 33) server 108 are also connected to the backbone network 102 through redundant routers 110 and 111. Many other server types, not shown, may be found on the main network 102, for example, Domain Name System servers, communication servers, fire wall servers, data servers, directory servers, and the like.

Backbone network 102 may be connected to other networks, network segments, and sub-networks. Two example connections are shown in FIG. 1, headends 112 and 114. Within headend 112 is another router 116 which connects to multiple headend nodes 118–120 through a switch 121. Each headend node 118–120 connects to fiber nodes 122–124 through fiber optic cables 126–128 respectively. Fiber nodes 122–124 bridge between the fiber optic cables 126–128 and coaxial cables 130–132. The coaxial cables tap into the customers homes (not shown) to cable modems 134–136. Cable modem 134 is connected directly to one customer's personal computer (PC) 138. Cable modem 136 connects to a second customer's PC 140 through a hub 142.

The second connection shown is similar to the one just described. Headend 114 connects to other headend nodes, fiber nodes, cable modems and PC's (not shown) in another part of the city, or in another city altogether.

Many other variations of the network configuration are possible. The present invention may be presented with many different wide area networks, local area networks, fiber optic networks, fibre channel networks, dozens of different servers, routers, switchers, bridging circuits, modems, cable modems, and network interface cards. The preferred embodiment of the present invention deals with the variations by using the TCP/IP (IAB standard protocols 7 and 5) standards for communication. Where the web-based troubleshooting tool is used in other types of networks, other communications standards could be used to accommodate the network devices.

Figure 2:
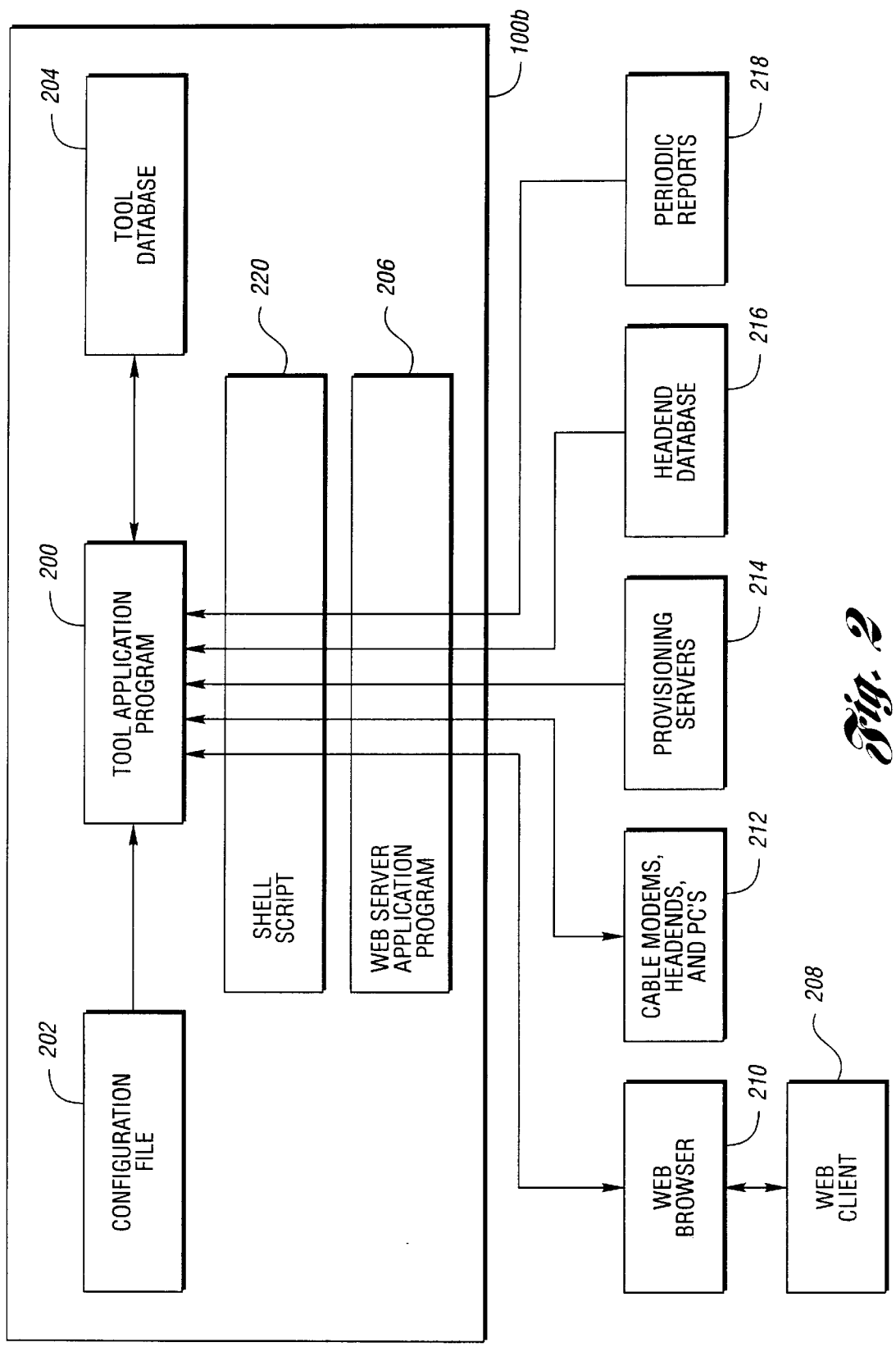
FIG. 2 is a software block diagram of the present invention communicating with other applications.

FIG. 2 is a software block diagram of the present invention communicating with other applications. The web-based troubleshooting tool software applications 100b running on the host computer 100a are built around a tool application program 200. The tool application program 200 is a Common Gateway Interface (CGI) script that executes, parses, and generates dynamic hypertext markup language (HTML (IAB proposed standard protocol RFC 1866)) information back to the web client. This piece of code is independent of the operating system but dependent upon the configuration dependent entries in a configuration file 202 to operate properly. The tool application program 200 stores data about the devices in a tool database 204. Pertinent information obtained from lookup searches are loaded into hidden HTML properties (variables) and passed between the various tool options used by the HTML page. If any of the information is updated, the properties are also updated. These hidden properties also allow for sharing of the information with other tools that may require the same data. Web server application program 206 facilitates communications between the tool application program 200 and the web client 208, the web client's web browser 210, cable modems/headends/PC devices 212, one or more provisioning servers 214 (e.g., BOOTP and DHCP server applications), a headend database 216 and one or more periodic reports 218. Shell script 220 translates the interfaces between the tool application program 200 and web server application program 206 to accommodate web server application programs 206 from different vendors.

Information is received by the web-based troubleshooting tool from several sources. Provisioning servers 214 provide various data dumps about the IP address leases and registration of each MAC address they provision. As an example, the provisioning server application from Join Systems, Inc. provides two data dumps of parsed data in files "jdbdump -a" and "jdbreg -s". The format of file "jdbdump -a" is shown in Table 1 and file "jdbreg -s" is shown in Table 2. These files are typical of the information obtained from provisioning servers such as BOOTP or DHCP servers.

TABLE 1

File "jdbjump -a" Format

| Field | Name | Format Example |
|---|---|---|
| 1 | MAC address | 00:00:ca:03:61:84 |
| 2 | MAC address type | 1 |
| 3 | MAC address length (octets) | 6 |
| 4 | IP address | 10.128.44.51 |
| 5 | Start of lease (UCT) | Mon Jun 16 17:37:24 1997 |

TABLE 1-continued

File "jdbjump -a" Format

| Field | Name | Format Example |
|---|---|---|
| 6 | Lease expiration (UCT) | Mon Jan 18 22:14:07 2038 |
| 7 | Time when lease may be extended (UCT) | Mon Jun 16 17:37:24 1997 |
| 8 | Time when host last renewed or acquired this lease (UCT) | Fri Feb 27 09:14:29 1998 |
| 9 | IP address of server "owning" the lease | 10.128.1.34 |
| 10 | Hostname (without a domain) | bahlmann |
| 11 | Domain name | mediaone.net |

TABLE 2

File "jdbreg -s" Format

| Field | Name | Format Example |
|---|---|---|
| 1 | MAC address | 00:00:ca:03:61:84 |
| 2 | MAC address type | 1 |
| 3 | MAC address length (octets) | 6 |

The web-tool troubleshooting application also receives periodic reports 218 from customer databases. Two such reports are a "Remedy" reports and a "Stage" reports moved to the web server application program 206 daily. Remedy and Stage are applications that extract information from a core customer database, usually an Oracle database, and assemble the information into reports. Table 3 is an example of a high speed data-domain name system (HSD-DNS) report. Table 4 is an example of a domain name system name (DNS Name) report.

TABLE 3

"HSD-DNS" Report

| Field | Name | Format Example |
|---|---|---|
| 1 | Email address | bahlmann |
| 2 | City | Reading |
| 3 | Fiber node | 6 |
| 4 | PC MAC address | 00:a0:24:90:cf:22 |
| 5 | Modem MAC address | 00:00:ca:03:61:84 |
| 6 | Phone | 781-944-4329 |
| 7 | Last name | BAHLMANN |
| 8 | First name | BRUCE |
| 9 | Street number | 243 |
| 10 | Street name | South Street |
| 11 | Password | maidin |

TABLE 4

"DNS Name" Report

| Field | Name | Format Example |
|---|---|---|
| 1 | hostname | bahlmann |
| 2 | MAC address | 00:a0:24:90:cf:22 |

Information is also received from a headend database 216. This database contains network configuration information such as gateway addresses, customer network configurations, city names, and fiber node names. Finally, data can be obtained from the cable modems/headends/PC devices 212 themselves. By issuing the appropriate Simple Network Management Protocol (SNMP)(IAB standard protocol STD 15) command sequences, many devices 212 can provide values from internal sensors, stored programmable parameters, fixed internal variables and diagnostics data.

Tool database 204 stores data for each device on the network having a medium access control (MAC) address. The data is divided into three categories: server data, owner data, and health data. Sever data is information concerning the provisioning server that provided the Internet Protocol (IP) address lease to a particular device. Owner data is information about the customer that owns the selected device. Health data is information obtained directly from the selected device itself. Each category of data may be stored in separate directories on the host computer 100a, or stored together as a single database. Sample formats for the server data, owner data and health data are provided in Table 5, Table 6 and Table 7 respectively.

TABLE 5

Server Data

| Field | Name | Format Example |
|---|---|---|
| 1 | Server update time (Seconds since 1970 UCT) | 870634856 |
| 2 | Address type | Dynamic |
| 3 | MAC address | 00:00:ca:03:61:84 |
| 4 | MAC address type | 1 |
| 5 | MAC address length (octets) | 6 |
| 6 | IP address | 10.128.44.51 |
| 7 | Start of lease (UCT) | Mon Jun 16 17:37:24 1997 |
| 8 | Lease expiration (UCT) | Mon Jan 18 22:14:07 2038 |
| 9 | Time when lease may be extended (UCT) | Mon Jun 16 17:37:24 1997 |
| 10 | Time when host last renewed or acquired this lease (UCT) | Fri Feb 27 09:14:29 1998 |
| 11 | IP address of server "owning" the lease | 10.128.1.34 |
| 12 | Hostname (without a domain) | bahlmann |
| 13 | Domain name | mediaone.net |
| 14–17 | Not Used | |

TABLE 6

Owner Data

| Field | Name | Format Example |
|---|---|---|
| 1 | Server update time (Seconds since 1970 UCT) | 870634716 |
| 2 | MAC address | 00:00:ca:03:61:84 |
| 3 | IP address | 10.128.44.51 |
| 4 | Email address | bahlmann |
| 5 | City | Reading |
| 6 | Fiber node | 6 |
| 7 | PC MAC address | 00:a0:24:90:cf:22 |
| 8 | Modem MAC address | 00:00:ca:03:61:84 |
| 9 | Remedy report hostname | N/A |
| 10 | Phone | 781-944-4329 |
| 11 | Last name | BAHLMANN |
| 12 | First name | BRUCE |
| 13 | Street number | 243 |
| 14 | Street name | South Street |
| 15 | Password | maidin |
| 16–18 | Not Used | |

TABLE 7

Health Data

| Field | Name | Format Example |
|---|---|---|
| 1 | Server update time (Seconds since 1970 UCT) | 87037528 |

TABLE 7-continued

Health Data

| Field | Name | Format Example |
|---|---|---|
| 2 | MAC address | 00:00:ca:03:61:84 |
| 3 | IP address | 10.128.44.51 |
| 4 | Rx calibration | Not Calibrated |
| 5 | Tx Power (dBmV) | 47.28 |
| 6 | Current Key | default_key |
| 7 | Last Key | default_key |
| 8 | Uptime | 0:10:27 |
| 9 | Min Rx since bs | −02.78 |
| 10 | Avg Rx since bs | −02.78 |
| 11 | Max Rx since bs | −02.68 |
| 12 | Tx Frequency (kHz) | 26750 |
| 13 | Rx Frequency (kHz) | 543000 |
| 14 | Upstream bandwidth (b/s) | 1500000 |
| 15 | Downstream bandwidth (b/s) | 300000 |
| 16 | Tx Eq Figure | 7 |
| 17 | Rx Eq Figure | 7 |
| 18 | Headend node | MA-reading-6 |
| 19 | Headend IP address | 10.128.44.30 |
| 20 | Software version_Type | 3.10_LCp |
| 21 | Serial number | 62704760 |
| 22 | Headend | zionhill |
| 23 | Total Unilink (CATV) pkts sent | 90 |
| 24 | Packets/error | 0 |
| 25 | Headend MAC address | 00:00:ca:03:29:40 |
| 26–29 | Not Used | |

Whenever the tool application program 200 looks up information on a new device, it saves a copy of that data in the tools database 204 under that device's MAC address. The uniqueness of the MAC address allows the tool application program 200 to update several files simultaneously. This data is subsequently used each time the web client 208 calls up information on a selected device. The latency of the data is intentional for performance reasons and also troubleshooting reasons. This allows the web client 208 to have a before and after snapshot of the data and significantly limits the number of calls required to the provisioning servers 214.

Figure 3:
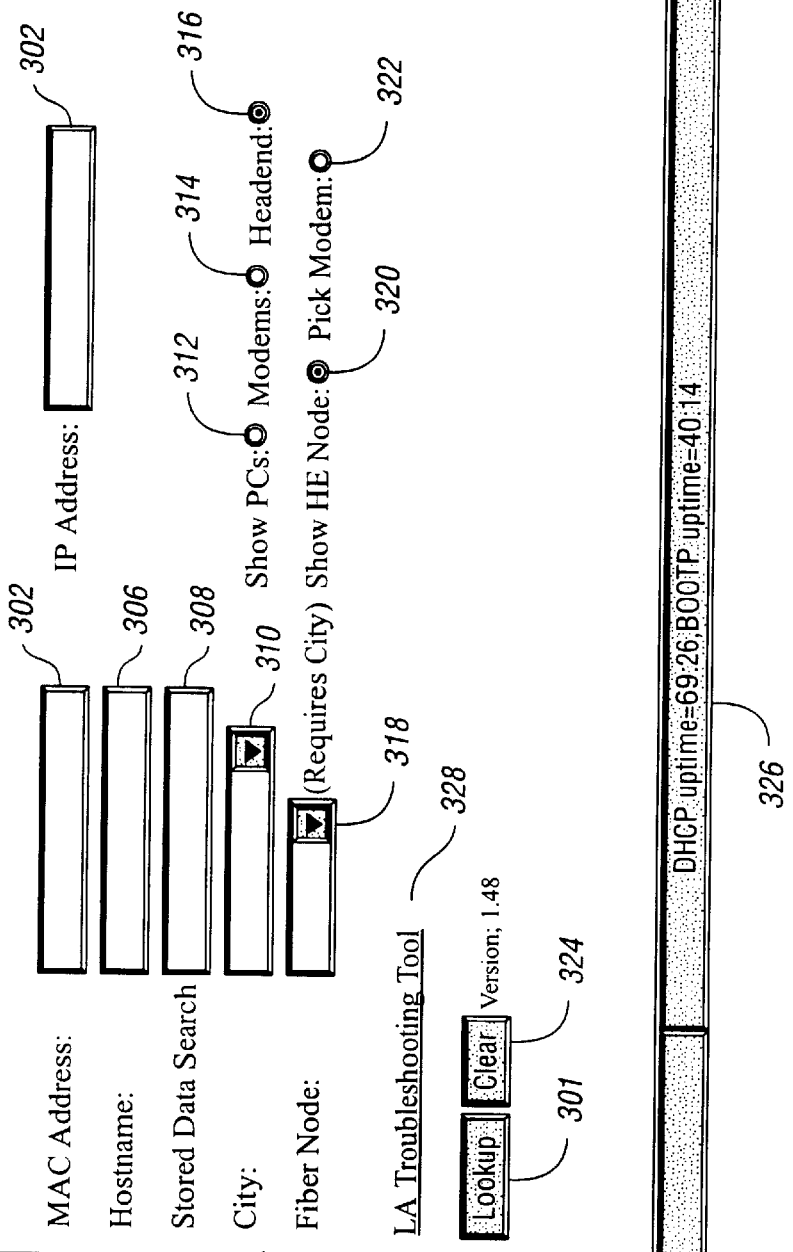
FIG. 3 is an example of a search page display with a provisioning server status scroll line.

FIG. 3 is an example of a search page 300 as displayed to the web client 208. Usually, one search parameter is entered and the Lookup button 301 is selected. Possible search parameters include a full or partial MAC Address entry 302, a full or partial IP Address entry 304, and a full of partial Hostname entry 306. The Hostname entry 306 should not include the domain name. A Stored Data Search entry 308 will search the tool database 204 for any match to the character string entered. The Stored Data Search may include searching by customer name, searching for all cable modems of a specific type, and all devices with a particular version of software. The search parameter may also be a City entry 310. When a search by city is desired the web client 208 must also select a PC radio button 312, a (cable) Modem radio button 314, or a Headend radio button 316 to define the search. The PC radio button 312 and Modem radio button 314 lists devices by headend node. The Headend radio button 316 lists all of the headend nodes for the selected city. To get information on a particular fiber headend node, the City entry 310, Fiber Node entry 318, and Show HE Node radio button 320 are selected. To show all of the cable modems associated with a particular fiber headend node, the City entry 310, Fiber Node entry 318, and Pick Modem radio button 322 are selected. The Clear button 324 clears all current entries.

The search page 300 includes two additional features to aid the web client 208. First, a scrolling message 326 is provided at the bottom of the page. Here the uptime (hours and minutes since the last power or software recycle) of the provisioning servers 214 is displayed. Provisioning servers 214 are restarted daily to purge log files, so a time of less than 24 hours is expected. Should a provisioning server 214 fail to provide its uptime, the scrolling message 326 will display "<server type> Server is Down!". This message means the provisioning server application is not running, but it does not necessarily mean that the computer running the provisioning server application is down. The second feature is a hyperlink 328 to another copy of the web-based troubleshooting tool software application 100b running in a different region of the country. In this example, hyperlink 328 is a hyperlink to the Los Angeles region.

Figure 4:
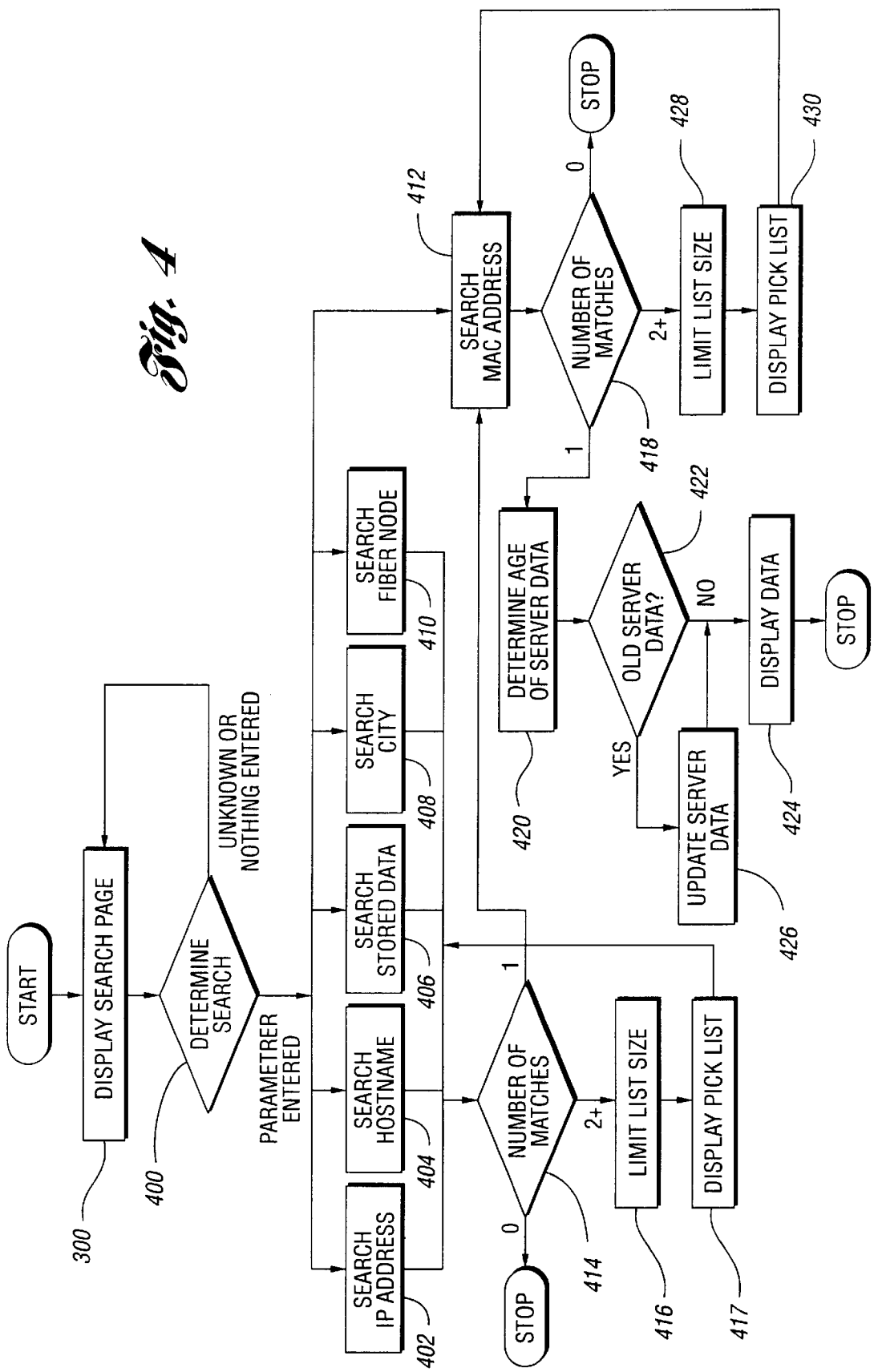
FIG. 4 is a flow diagram of a search function.

FIG. 4 is a flow diagram of a search function. The web client 208 enters the search parameter(s) into the search page 300. A determination, shown by decision block 400, is made about what areas of the tool database 204 and headend database 216 to search, or if nothing has been entered, or if the search parameter is an unknown. Depending upon the search parameter(s) entered, the searches will be conducted by IP Address 402, Hostname 404, Stored Data 406, City 408, Fiber Node 410 or MAC Address 412. If the search is by IP Address 402, Hostname 404, Stored Data 406, City 408 or Fiber Node 410, the number of matches is checked, shown as decision block 414. If only one match is found, the search for the MAC address 412 for that one match is conducted. If more than one match is found the size of the list will be limited, as shown in block 416 so that the first pick list 417 will have a reasonable number of entries for the web client 208 to scroll through. The web client 208 must select one item from the first pick list 417, and then the search for the MAC Address 412 for that item is conducted. After the search for the MAC Address 412 is completed, the number of MAC address matches is checked, shown by decision block 418. If no matches are found, the search is ended. If only one MAC address is found, then the age of the server data for that particular MAC address is checked, block 420. If the server data is less than 3 hours old, decision block 422, then the server data, owner data, and health data for the selected MAC address are gathered for display 424. If the server data is more than 3 hours old, the tool application program 200 updates the tools database 204 with the latest server data dump from the provisioning server 214, as shown in block 426. Afer the tool database 204 is updated, the server data, owner data and health data for the selected MAC address are gathered for display, as shown in block 424. If more than one MAC address is found by decision block 418, then the list of matching MAC addresses is limited to a reasonable number of entries, as shown in block 426, and a second pick list 430 is generated. After the web client 208 selects one MAC address from the second pick list 430, the search for the MAC address 412 is redone.

Figure 5:
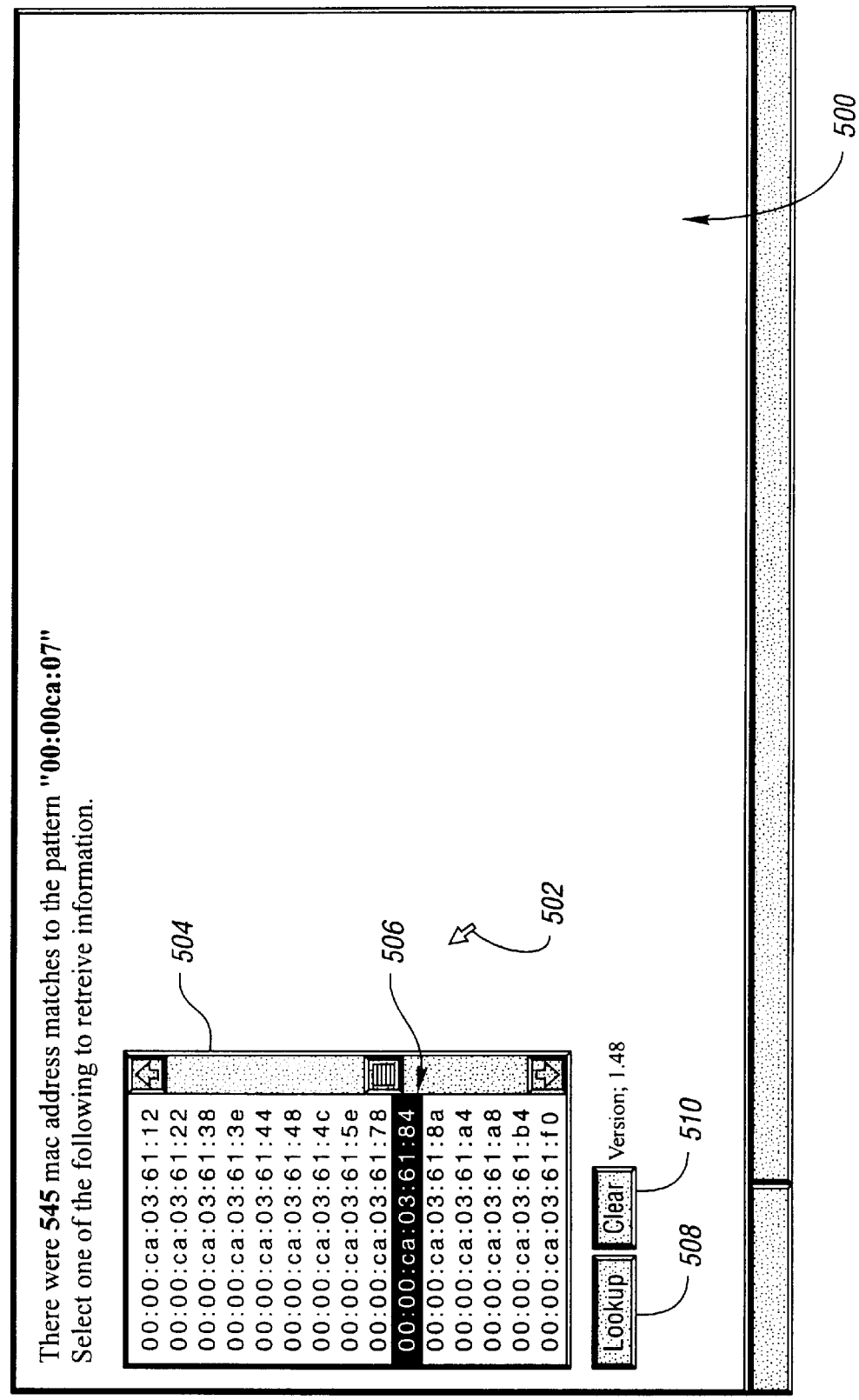
FIG. 5 is an example of a pick list page display.

FIG. 5 is an example of a pick list page 500. The pick list page 500 may contain either the MAC address pick list 430 or the first pick list 417. FIG. 5 shows an example of the MAC address pick list 430 that resulted from a search to a partial MAC address pattern of "00:00:ca". Using the cursor 502 and scroll bar 504, the web client 208 chooses one entry 506 from the list. The Lookup button 508 accepts the one entry 506 as the selected MAC address. The Clear button 510 deselects the one entry 506.

Figure 6:
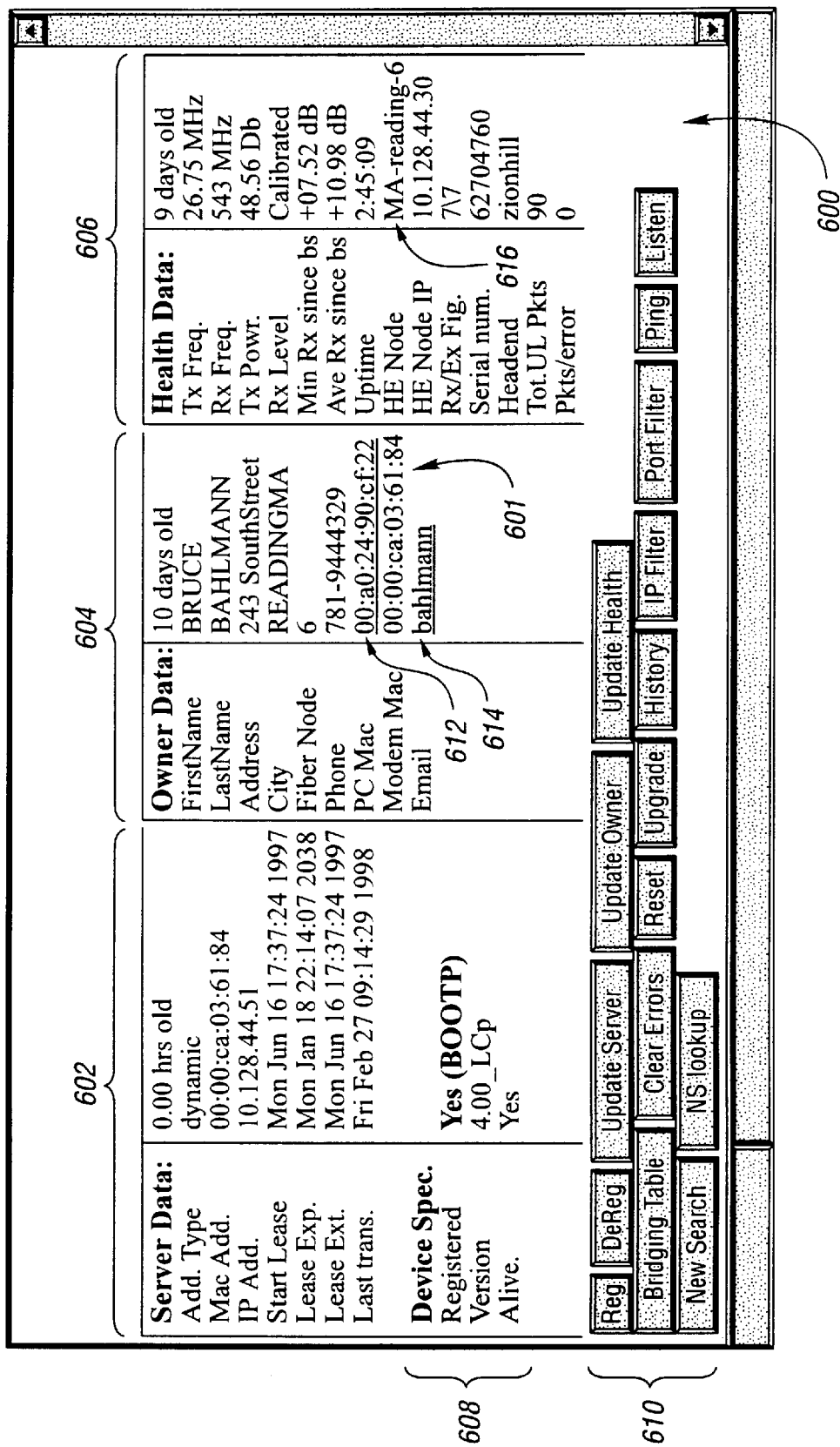
FIG. 6 is an example of a general information page display.

FIG. 6 is an example of a general information page 600 where the selected MAC address 601 is 00:00:ca:03:61:84. General information page 600 is broken into five areas. The first three areas are the server data 602, owner data 604 and the health data 606 as stored in the tool database 204. The fourth area 608 contains device specific information. The device specific information includes registration status (Yes or No) and the type of provisioning server (BOOTP or DHCP), the version of the software loaded, and wether or not the web-tool troubleshooting tool can reach the selected MAC address (Alive?). To determine if the selected MAC address can be reached, a quick ping command sequence is executed when the information for the general information page 600 is loaded. The fifth area 610 is a set of buttons to initiate functions that will be discussed in more detail in the paragraphs that follow.

The general information page 600 also may contain hyperlinks to help navigate to other data associated with the selected MAC address. FIG. 6 shows three hyperlinks (underlined data), one for the PC MAC address 612, one for e-mail 614, and one for the headend reference node 616. These hyperlinks will be discussed in more detail later.

Since different devices have different types of data associated with them, the general information page 600 may not include all of the data in the first four areas. For example, customers do not own headend nodes, so when the selected MAC address 610 is for a headend node then no owner data is shown. Also, where the network interface device of a PC (internal modem, external modem or network interface card) does not support the SNMP, then no health data is available to display.

The utility buttons in fifth area 610 of FIG. 6 allow the web client 208 to initiate different functions to help troubleshoot and verify the device at the selected MAC address. Some of these devices maintain bridging tables that the web client 208 may want to examine. FIG. 7 is an example of a bridging table page 700 of the data obtained per the bride table function flow diagram shown in FIG. 8. A cable modem's bridge forwarding table is a dynamic holding place for MAC addresses learned by a cable modem. (This table works similarly to a router's bridging table that learns the MAC address of devices that have talked recently.) The default time-to-live, for example of a LANCity, Inc. cable modem, is 300 seconds, so only devices that have recently talked will be found in this table. Since every cable modem has two ports, there are two lists of MAC addresses shown on the bridging table page 700. The Ethernet Side list 702 shows the MAC addresses for the devices communicating on the cable modem's Ethernet port. The CATV Side 704 shows the MAC addresses for the traffic on the cable modem's coax cable port. This function is useful for finding devices. For example, one can find the actual MAC address of the devices that a customer has connected to his cable modem on the Ethernet side 702. This type of information is useful if the customer has connected a device not registered with a provisioning server. The CATV Side 704, shows the MAC addresses of the other cable modems. This functionality exists for headend cable modems as well, and in particular, the CATV Side 704 represents the other cable modems while the Ethernet Side 702 represents servers, routers and switcher on that network segment.

Referring to FIG. 8, the bridge table function starts when the tool application program 200 receives a bridge table command, block 800. The tool application program 200 then initiates a quick ping command sequence, as shown in block 802, to determine if the selected MAC address 601 is alive, as shown in decision block 804. If the selected MAC address 601 successfully responds to the quick ping, tool application program 200 determines the proper Management information Base (MIB) and community strings to use for SNMP commands, as shown in block 806. (An MIB is a collection of managed objects for each device used with the SNMP.) Tool application 200 then sends a sequence of SNMP commands to the selected MAC address 601 requesting a bridge forwarding table, block 808. The selected device responds by sending the bridge forwarding table received by the tool application program 200, as shown in block 810. The web server application program 206 then incorporates the bridge forwarding table into a HTMP page, block 812, that is then provided to the web client 208, as shown in block 814. If decision block 804 determines that the selected MAC address 601 is not alive, then the web server application program 206 incorporates an error message into the general information HTML page 600, as shown in block 816. The updated HTML page with the error message is then provided to the web client 208, as shown in block 818. The quick ping command test of block 802 and 804 keeps the tool application program 200 from waiting for a selected MAC address 601 that is not alive and thus will never respond to the SNMP command sequences.

Figure 9:
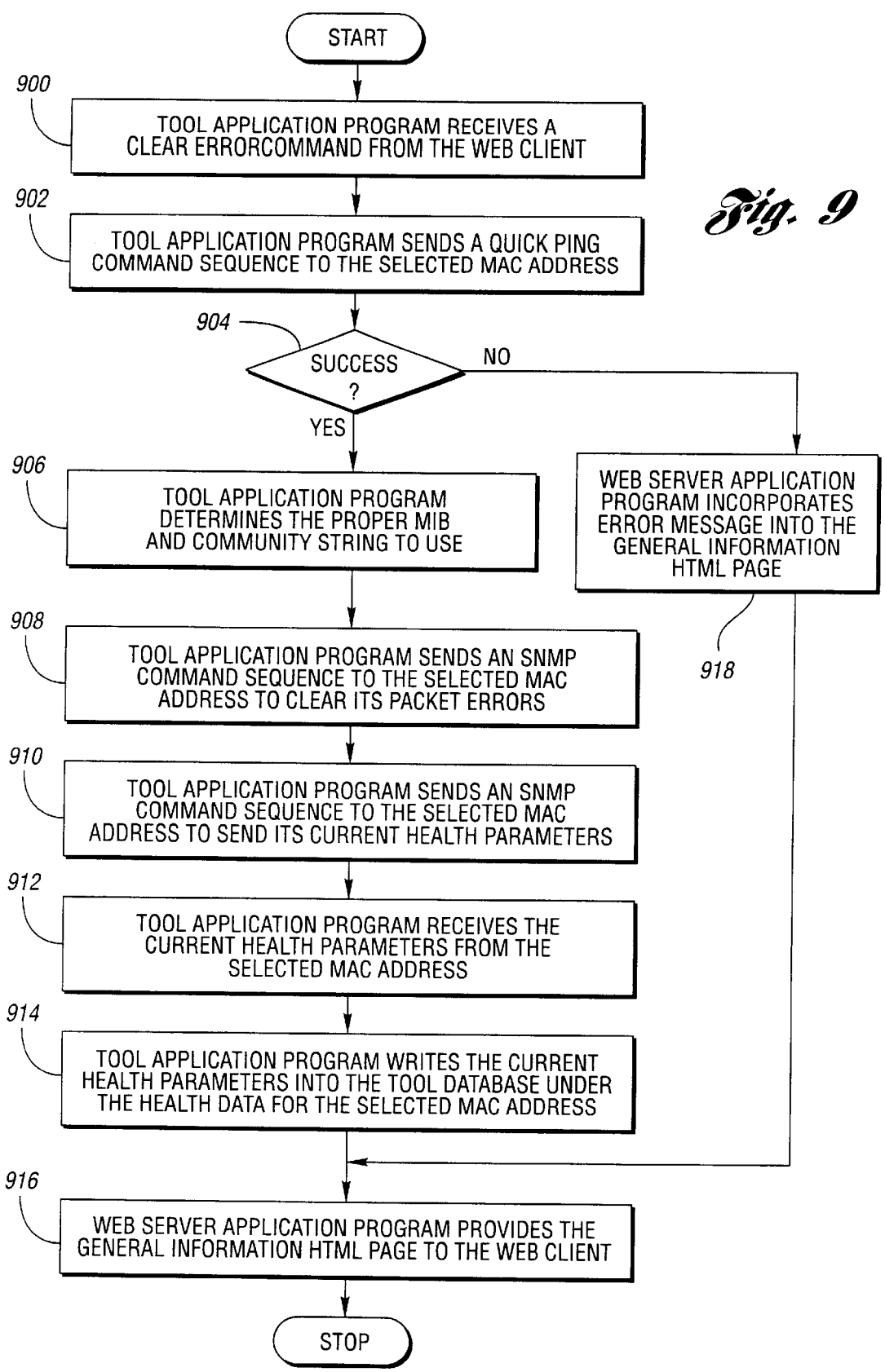
FIG. 9 is a flow diagram of a clear error command function.

FIG. 9 is a flow diagram for a clear error function. Occasionally communication on the network becomes noisy. While noise shows up in many different ways, one of the most obvious effects is packet error. Some devices have error logs to record the total number of errors and/or the packet error rates. The clear error function allows the web client 208 to empty the error log of a selected device. The function starts with the receipt of a clear error command from the web client 208, shown as block 900. The tool application program 200 responds to the received command by sending a quick ping command to the selected MAC address 601, as shown in block 902. If the quick ping is successful, decision block 904, then the proper MIB and community strings from the selected MAC address 601 are determined, as shown in block 908. Tool application 200 sends an SNMP command sequence to the selected MAC address 601, to clear its pack errors, as shown in block 902. The tool application program 200 then sends an SNMP command sequence for the selected MAC address 601 to send its current health parameters, which includes the error log, as shown in block 910. Upon receipt of the current health parameters, block 912, the tool application program 200 writes them into the tool database 204, as shown in block 914. Web server application program 206 provides the updated information in the general information page 600 to the web client 208, as shown in block 916. If decision block 904 determines that the selected MAC address 601 is not alive, then the web server application program 206 incorporates an error message into the general information page 600, as shown in block 918.

FIG. 10 is an example of a de-register page 1000 for the de-register function, and FIG. 11 is the associated flow diagram. Sometimes the need arises for a MAC address to be de-registered with a provisioning server so that the Stage and Remedy reports list that MAC address as not registered. Since the web-base troubleshooting tool cannot change the contents of the Stage and Remedy reports, a request must be made the servers that created these reports to change their contents. The selected MAC address 601 to be de-registered is the same as shown on the general information page 600. De-registration also requires a password entry 1002. The function starts upon receipt of a re-register command from the web client 208, as shown in block 1100. Next the password is validated, decision block 1102. If the password is valid, the tool application program 200 issues a request to the provisioning servers 214 to de-register the selected MAC address 601, as shown in block 1104. When the de-registration is complete, the web server application program 206 returns the web client to the general information page 600, as shown in block 1106. Where decision block 1102 determines that the password is invalid, an error message is added to the general information page 600, as shown in block 1108.

FIG. 12 is an example of a register page 1200 for the register function, and FIG. 13 is the associated flow diagram. Sometime a MAC address needs to be registered with a provisioning server 214 so that the Stage and Remedy reports reflects the status as registered. As with the de-registration function, the selected MAC address 601 is the same as shown on the general information page 600, and a password entry 1202 is required. The function starts upon receipt of a register command, block 1300. Next the password is validated, decision block 1302. If the password is valid, the tool application program 200 issues a request to the provisioning servers 214 to register the selected MAC address 601, as shown in block 1304. When the registration is complete, the web server application program 206 returns the web client to the general information page 600, as shown in block 1306. Where decision block 1302 determines that the password is invalid, an error message is added to the general information page 600, as shown in block 1308.

Figure 16:
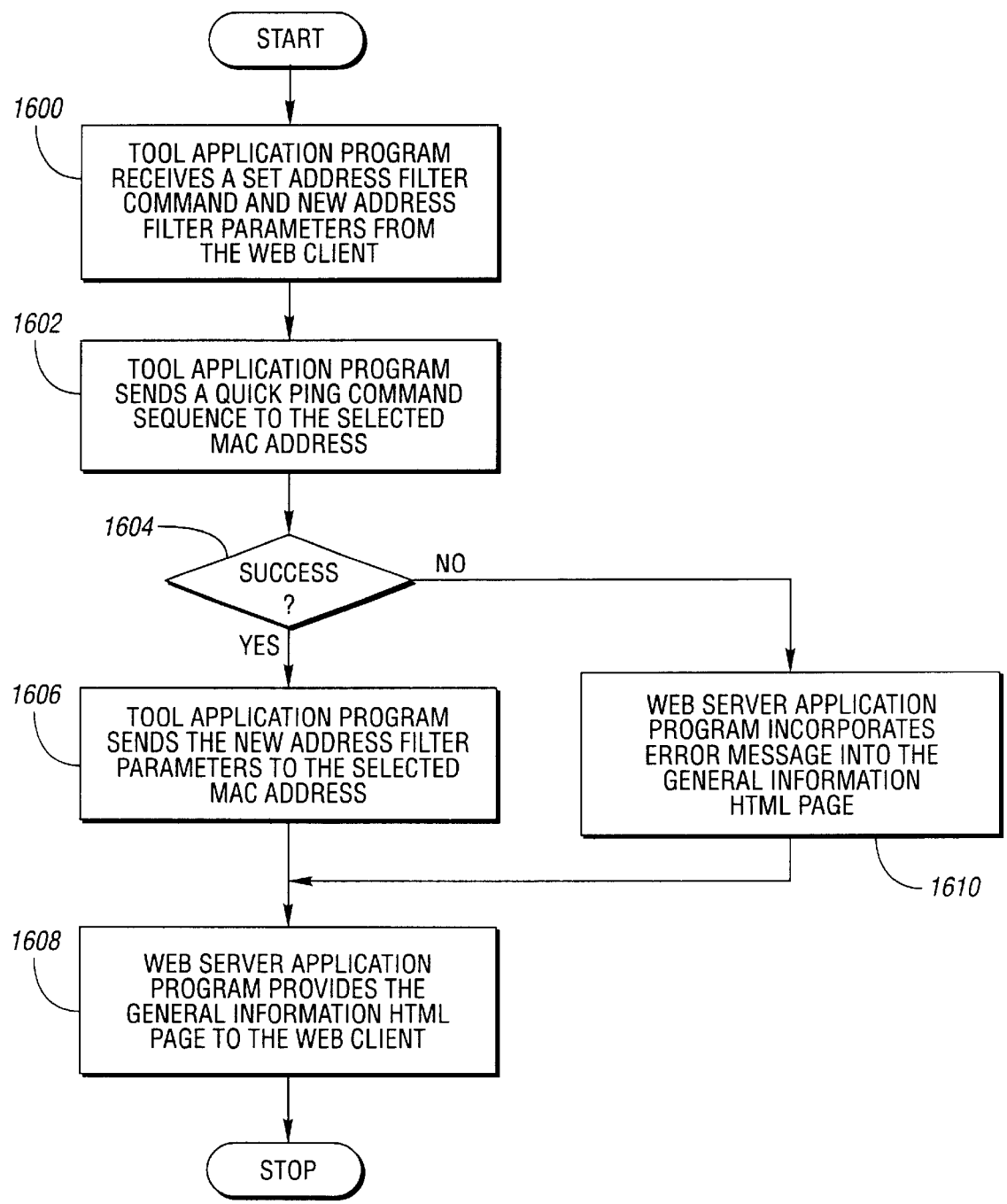
FIG. 16 is a flow diagram for applying new address filter parameters.
Figure 17:
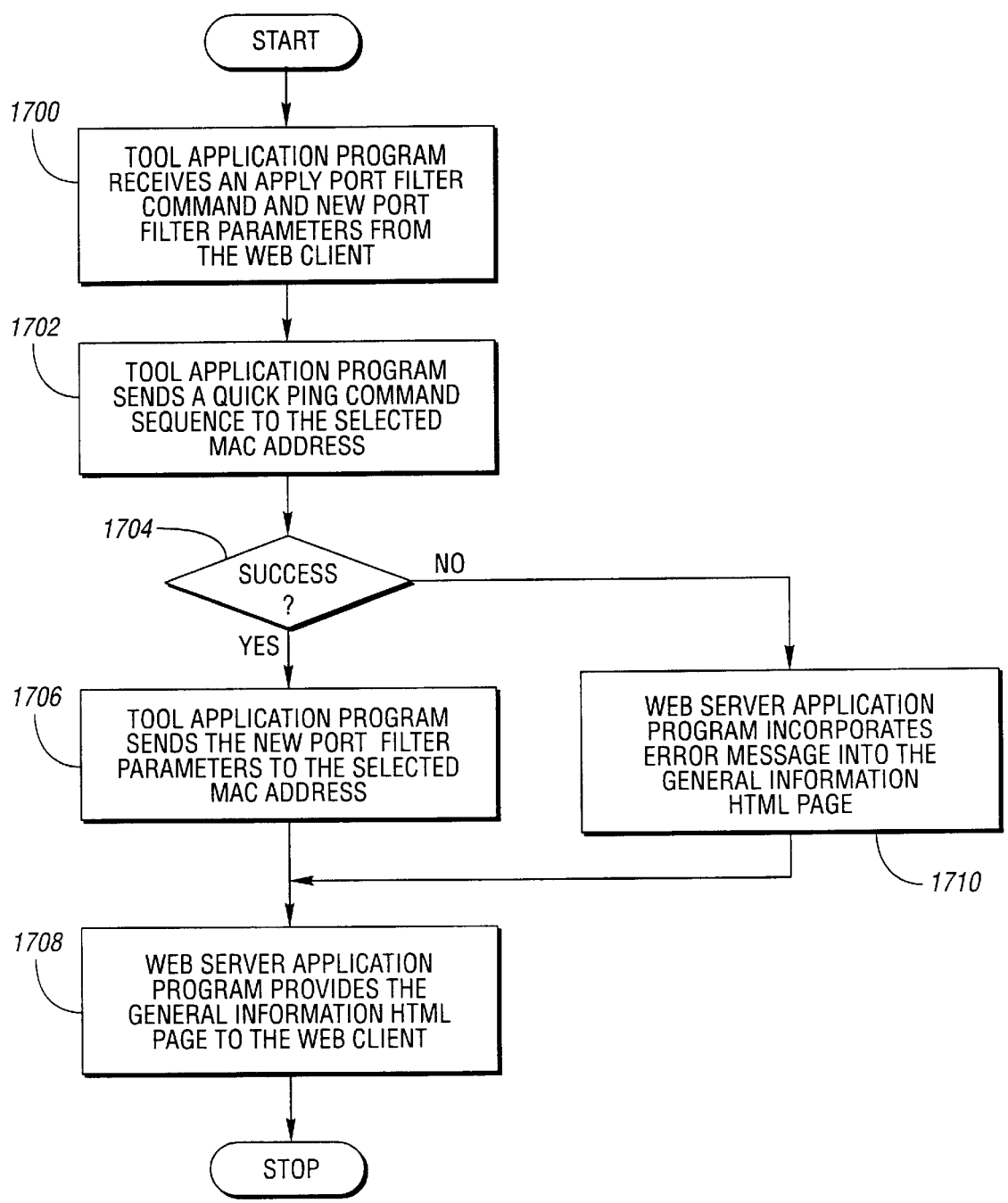
FIG. 17 is a flow diagram for automatically applying new 24Net Isolation address filter parameters.
Figure 18:
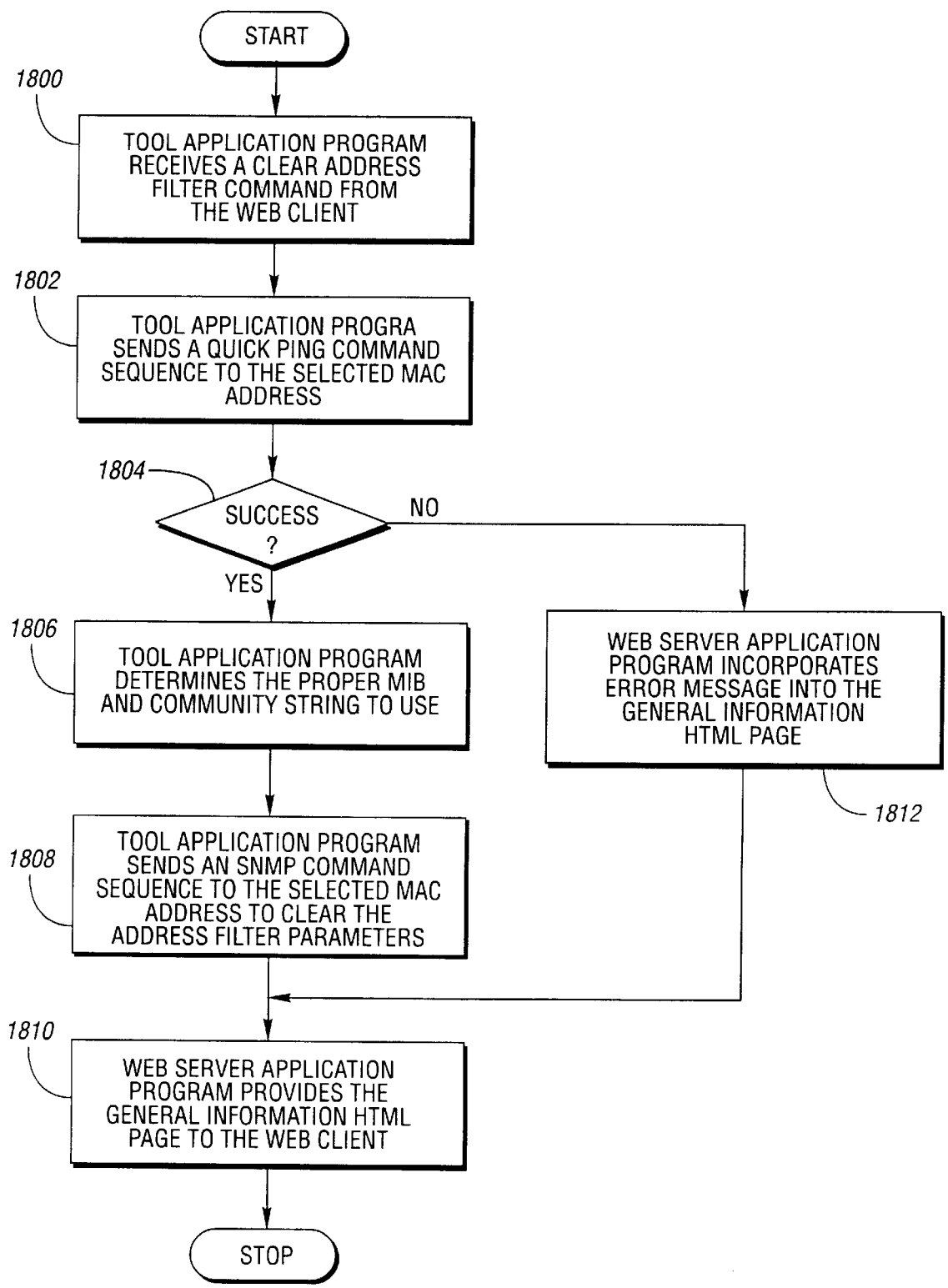
FIG. 18 is a flow diagram of a clear all address filter command function.

FIG. 14 is an example of an address filter page 1400 for the address filter function. FIG. 15 is a flow diagram to obtain and displays the current address filter parameters as read from the selected MAC address 601. FIG. 16 is a flow diagram to establish new address filter parameters, and FIG. 17 is a flow diagram to establish 24Net address filter parameters. FIG. 18 is a flow diagram to clear the address filter parameters at the selected MAC address 601.

The address filter function sets parameters to pass or block a range of IP addresses at either modem interface. Referring to FIG. 15, upon receipt of an address filter command, block 1500, the tool application program 200 initiates a quick ping command sequence, block 1502, to the selected MAC address 601. If the quick ping is successful, decision block 1504, the proper MIB and community strings are determined for the selected MAC address 601, as shown in block 1506. The tool application program 200 sends an SNMP command sequence to the selected MAC address 601 to send its current address filter parameters, block 1508. When the current address filter parameters are received, block 1510, the web server application program 206 incorporates the address filter parameters into an address filter page 1400, as shown in block 1512. Address filter page 1400 is then provided to the web client 208, as shown in block 1514. When the decision block 1504 determines that the selected MAC address 601 is not alive, then the web server application program 206 incorporates an error message in to the general information page 600, as shown in block 1516. The general information page 600 is then provided to the web client 208, as shown in block 1518.

Referring to FIG. 14, the address filter page 1400 provides the web client 208 three EZ Set selections concerning the parameters, Use Manual Set 1402, Use 24Net Isolation 1418, and Clear All Filters 1426. Selecting the Use Manual Set radio button 1402 allows all of the address filter parameters to the chosen. By activating filters #1 1404 and #2 1406 (placing an X in the Status box at the top of the column) the web client 208 may choose the destination address 1408, destination address mask 1410, source address 1412, source address mask 1414, and what action 1416 (pass or block) to take. Selecting the 24Net Isolation radio button 1418 and entering the desired two octets 1420 of the IP address automatically activates filter #3 1422. (24Net is a registered network associated with multiple system operator cable companies.) The 24Net Isolation parameters enable only 24Net source and destination traffic that contains the two desired octets 1420 entered. Customers who experience this filter can reach local web sites directly, and Internet web sites only through a proxy server.

Once the manual or 24Net Isolation address filter parameters have been chosen then the Set Address Filter(s) button 1424 is selected. Referring to FIG. 16, upon receipt of a Set Address Filter Command and manual address filter parameters, block 1600, the tool application program 200 initiates a quick ping command, block 1602 to verify that the selected MAC address 601 is alive and ready to receive the new address filter parameters. If the quick ping is successful, decision block 1604, then the application program 200 sends the new address filter parameters to the selected MAC address 601, shown in block 1602. The web server application program 206, then returns to the general information page 600, as shown in block 1608. If decision block 1604 determines that the selected MAC address 601 is not alive, then as error message is shown in the general information page 600, as shown in block 1610.

Referring to FIG. 17, where the Set Address Filter Command is received with the 24Net Isolation parameters, block 1700, the tool application program 200 initiates a quick ping command sequence, block 1702. If the quick ping is successful, decision block 1704, then the tool application program 200 sends the parameters to the selected MAC address 601, as shown in block 1706. Web server application program 206 then returns the web client 208 to the general information page 600, as shown in block 1708. When the selected MAC address 601 fails to respond to the quick ping command, the NO branch of decision block 1704, then an error message is added to the general information page 600, as shown in block 1710.

To clear the current address filter parameters at the selected MAC address 601 the web client 208 selects the Clear All Filters radio button 1426 in FIG. 14. Referring to FIG. 18, upon receipt of a Clear Address Filter Command, block 1800, the tool application program 200 initiates the quick ping command, block 1802 and checks for a successful response, decision block 1804. If the quick ping is successful, the tool application program 200 sends an SNMP command sequence to the selected MAC address 601 to clear its address filter parameters, block 1806. (To verify that the address filter parameters have been set to the new values or cleared, the address filter function must be rerun to view the parameters at the selected MAC address 601.) Web server application program 206 then returns to the general information page 600, as shown in block 1810. If the quick ping was not successful, an error message is added to the general information page 600, as shown in block 1812.

Figure 20:
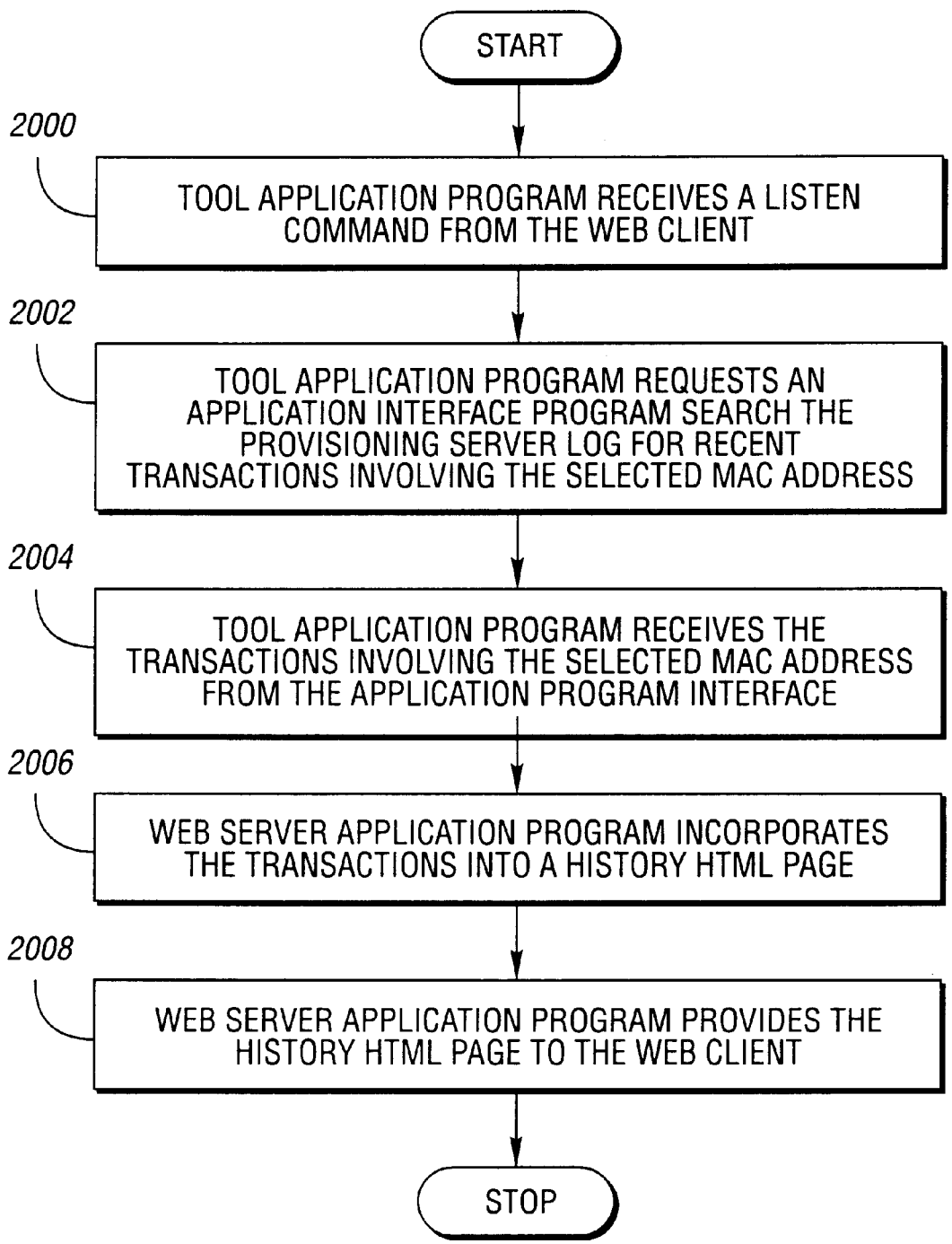
FIG. 20 is a flow diagram of a listen command function.

FIG. 19 is an example of a listen page 1900 and FIG. 20 is the associated flow diagram for the listen function. The listen function allows the log file of the DHCP/BOOTP server(s) to be viewed for transactions involving the selected MAC address 601. The log file contains important information regarding the transactions between the DHCP/BOOTP server(s) and the client's PC or cable modem. From this log, network problems and server related problems can be determined.

The listen function looks at the last 500 lines of the log file for all transactions in the past involving the selected MAC address 601. In situations where multiple provisioning servers 214 are in use, the selected MAC address 601 will be registered on only one provisioning server 214. In the example shown in FIG. 19, the selected MAC address 601, in this example 00:00:ca:03:61:84, is registered with the BOOTP server that returns one transaction response 1902. The DHCP server has not registered the selected MAC address and returns an "unregistered host" response 1904.

FIG. 20 is the flow diagram for the listen function. The listen function starts with the receipt of the listen function command by the tool application program 200, as shown in block 2000. Tool application program 200 requests an application interface program search the provisioning servers 214 for transactions involving the selected MAC address 601, as shown in block 2002. Tool application program 200 receives the results from the application program interface, as shown in block 2004. The transaction response are incorporated into the listen page 1900 by the web server application program 206, as shown in block 2006, and then provided to the web client 208, as shown in block 2008.

Figure 22:
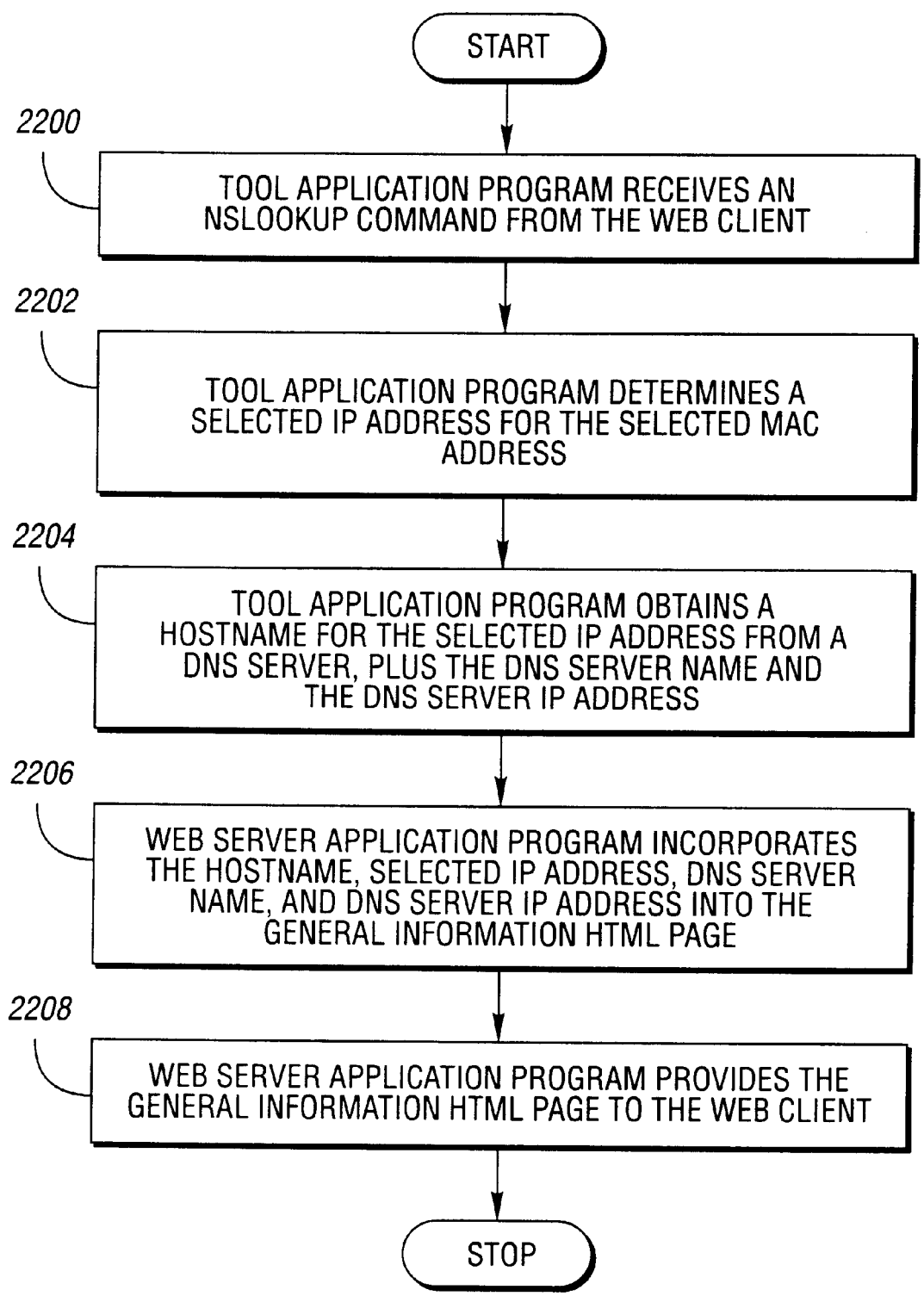
FIG. 22 is a flow diagram of a name server lookup command function.

FIG. 21 is an example of a name server lookup (NSLookup) information 2100 displayed on the general information page 600, and FIG. 22 is the associated flow diagram. The NSLookup function provides a means to find hostname information 2102 for the dynamic IP address 2104a and 2104b of the selected MAC address 601 from a Domain Name System (DNS) server. The DNS server address 2106 used for the lookup is defined in the operating system used by the web server application program 206. NSLookup starts in FIG. 22 with the receipt of a NSLookup command, block 2200. The tool application program 200 first determines the selected IP address 2104 for the selected MAC address 601, as shown in block 2202. Next, the tool application program 200 obtains the hostname for the selected IP address 2104, the DNS server name 2108, and the DNS server address 2106 from the DNS server, block 2204. The web server application program 206 incorporates the information into the NSLookup page 2100, as shown in block 2206, and provides it to the web client 208, as shown in block 2208.

FIG. 23 is an example of a ping results page 2300 and FIG. 24 is the flow diagram for the ping function. The ping function is used to determine if the selected MAC address 601 is reachable. Referring to FIG. 24, the ping function is initiated by the receipt of a ping command by the tool application program 200, block 2400. Tool application program 200 initiates a quick ping command sequence to the selected MAC address 601 as shown in block 2402. If the quick ping is successful, decision block 2404, then the tool application program 200 sends a normal ping command sequence, block 2406. The initial quick ping is used to prevent the normal ping process from hanging due to an unreachable device. Web server application program 206 incorporates the quick ping and normal ping results into the ping results page 2300, as shown in block 2408, which is provided to the web client 208, as shown in block 2410.

Figure 25:
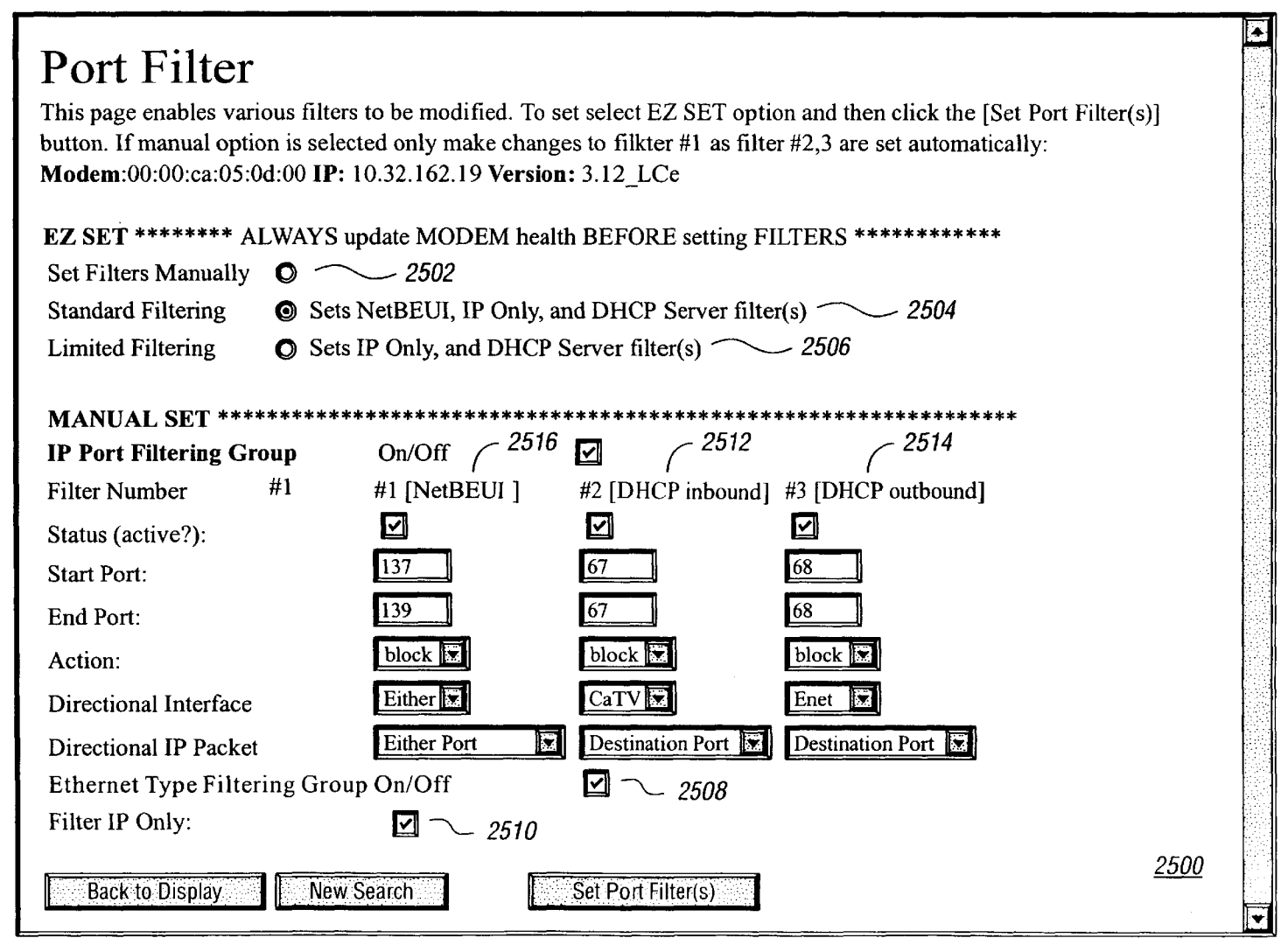
Figure 26:
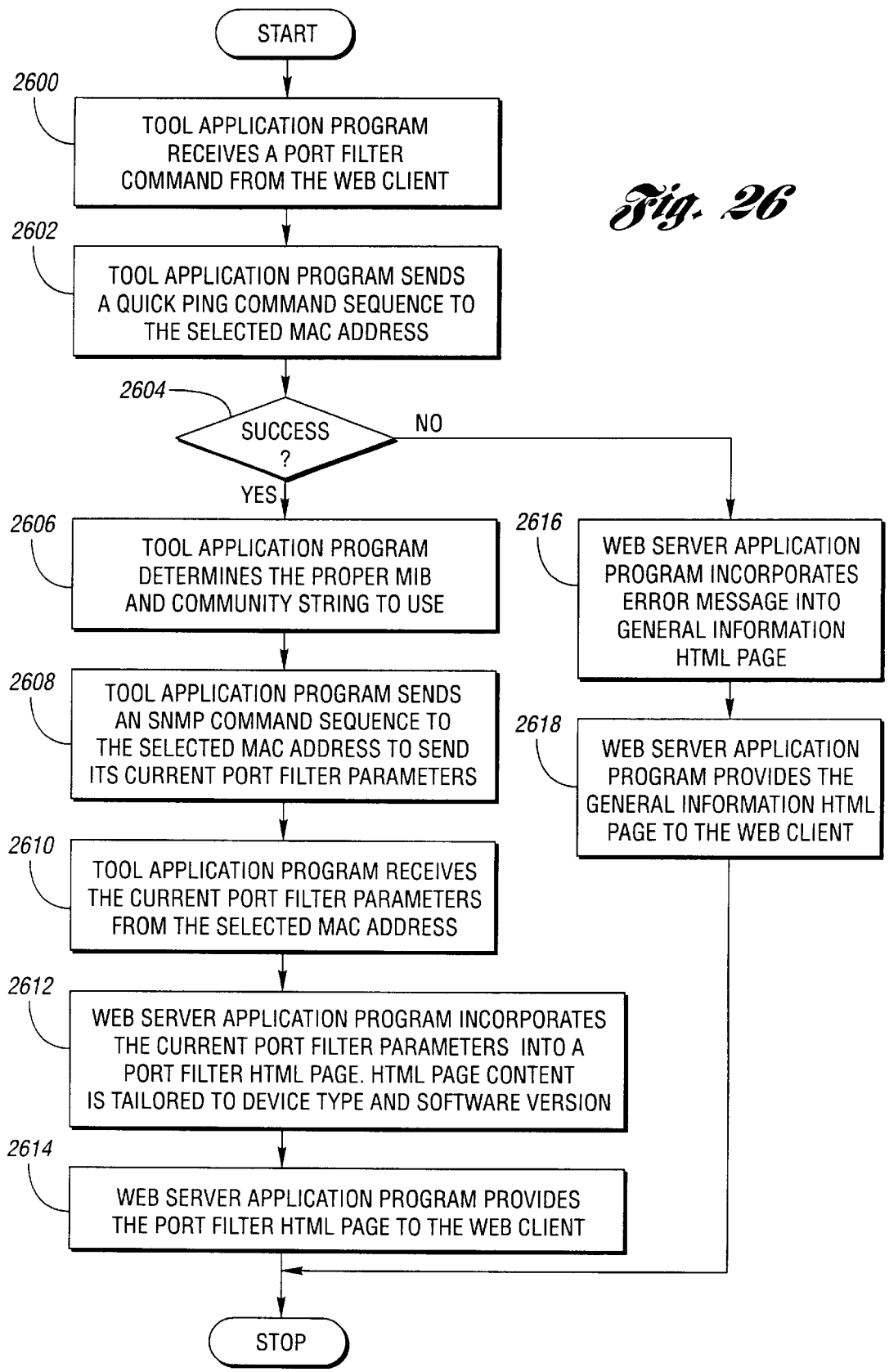
FIG. 26 is a flow diagram for displaying current port filter parameters.
Figures 27, 28:
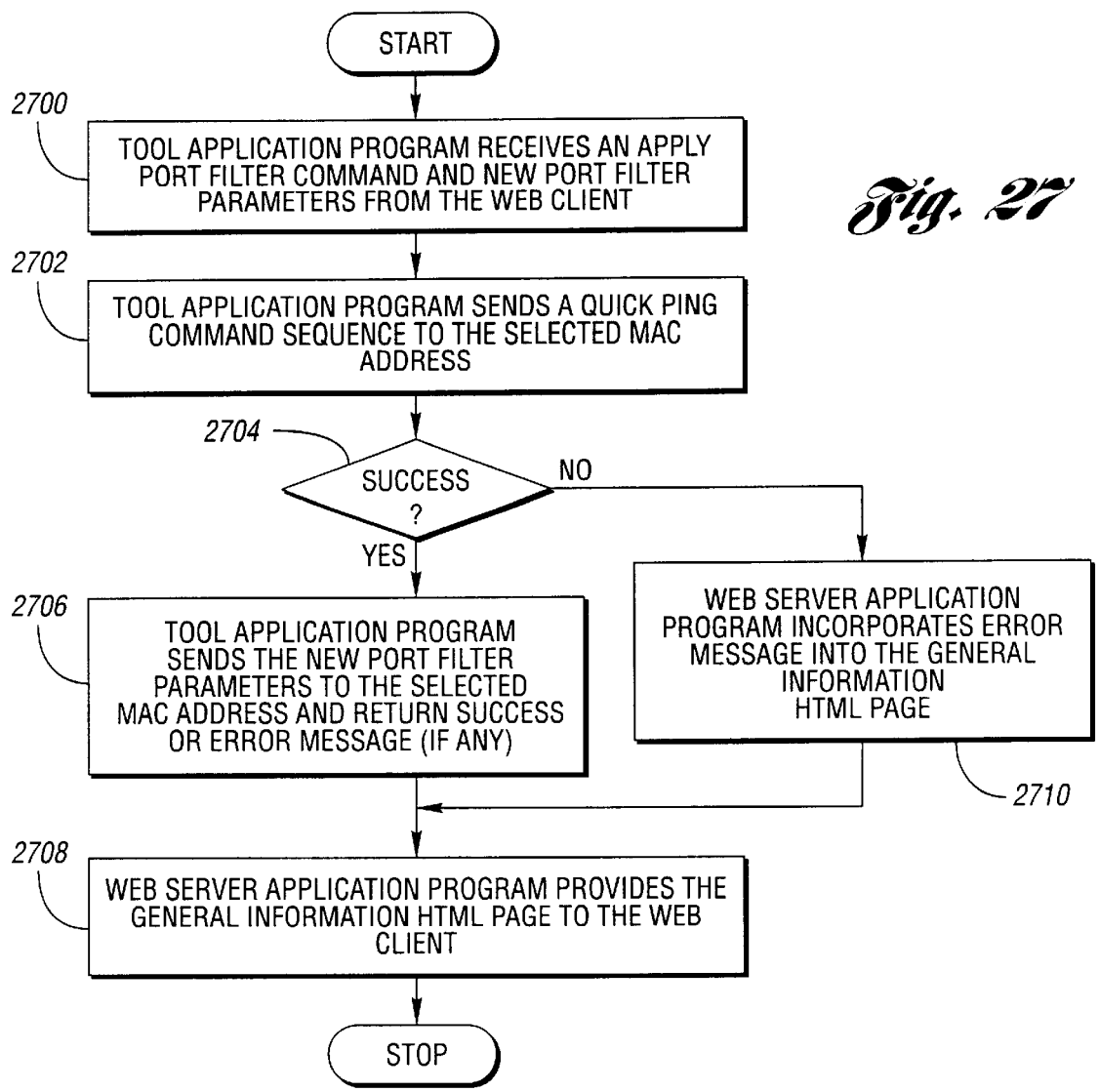
FIG. 27 is a flow diagram for applying new port filter parameters.
FIG. 28 is an example of a reset result page display.

FIG. 25 is an example of a port filter page 2500. FIG. 26 is the associated flow diagram to obtain the current port filter parameters from the selected MAC address 601. FIG. 27 is the flow diagram to establish new port filter parameters at the selected MAC address 601. Port numbers are descriptive addresses used in establishing communication connections between applications running on different computers. Commonly agreed upon port numbers include 80 for web servers, 21 for File Transfer Protocol applications, and 70 for gopher applications. The port filter function is a way of passing and blocking different types of traffic. FIG. 25 shown an example of the filter types provided for selected cable modems, such as the LANCity, Inc. cable modems. The three filter types are manual filtering 2502, standard filtering 250 and limited filtering 2506. Limited filtering 2906 includes an Ethernet type filtering group 2508, always active, an IP only filter 2508, always active, and defaults IP port filters #2, filter 2512 and #3, filter 2514 to block IP ports 67 and 68 respectively. These default settings on filters 2512 and 2514 are used to block customer DHCP servers from interfering with the service provider's DHCP server 106. Standard filtering 2504 provides for the Ethernet type filtering 2508, IP Only filtering 2510, the default DHCP filters 2512 and 2514, plus blocking IP ports 137 through 139, as shown in filter #1 2516. Manual filtering 2502 allows all of the port filter parameters to be set manually. Other types of port filters could be included on the port filter page 2500. For example, certain types of LANCity, Inc. cable modems support the Spanning Tree Protocol (STP)(IEEE standard 802.1D) An STP on/off parameter may be included on the port address page 2500 to allow the web client 208 the ability to switch the STP feature on and off.

Referring to FIG. 26, the port filter function starts with the receipt of a port filter command by the tool application program 200, as shown in block 2600. A quick ping is initiated, block 2602, to see if the selected MAC address 610 is alive, as shown in decision block 2604. Tool application program 200 then determines the proper MIR and community strings, block 2606 and sends an SNMP command sequence to the selected MAC address 601 to send its current port filter parameters, shown in block 2608. The tool application program 200 receives the current port filter parameters as shown in block 2610. The web server application program 206 incorporates the parameters into the port filter page 2500, as shown in block 2612, and provides the port filter page 2500 to the web client 208, shown in block 2614.

Referring to FIG. 27, when tool application program 200 receives an apply port filter command along with new port filter parameters, block 2700, then it initiates a quick ping command sequence to the selected MAC address 601, as shown in block 2702. If the quick ping was successful, decision block 2704, then tool application program 200 sends the new port filter parameters to the selected MAC address 601, as shown in block 2706. Finally, web server application program 206 returns the web client 208 to the general information page 600, as shown in block 2708. If decision block 2704 determines that the quick ping was not successful, then an error message is added to the general information page 600, as shown in block 2710.

FIG. 28 is an example of a reset result page 2800 and FIG. 29 is the associated flow diagram for the reset function. This function causes a software reset of the device at the selected MAC address 601. Referring to FIG. 29, the function starts with the receipt of the reset command, block 2900. Next the tool application program 200 sends a quick ping command sequence, block 2902, and checks for a successful response, decision block 2904. If the quick ping is successful, then tool application program 200 sends a reset command sequence to the selected MAC address 601 and wait one second, as shown in block 2906. After the one second wait another quick ping command sequence is initiated, block 2908. The success or failure of the selected MAC address 601 to reset is determined by the success of the second quick ping response, as determined by decision block 2910. The results are incorporated into the reset result page 2800, as shown in block 2912, and provided to the web client 208, as shown in block 2914. If the first quick ping failed in decision block 2904, then an error message is added to the general information page 600, as shown in block 2916. The web client 208 is then provided with the general information page 600 with the error message, as shown in block 2918.

Figure 31:
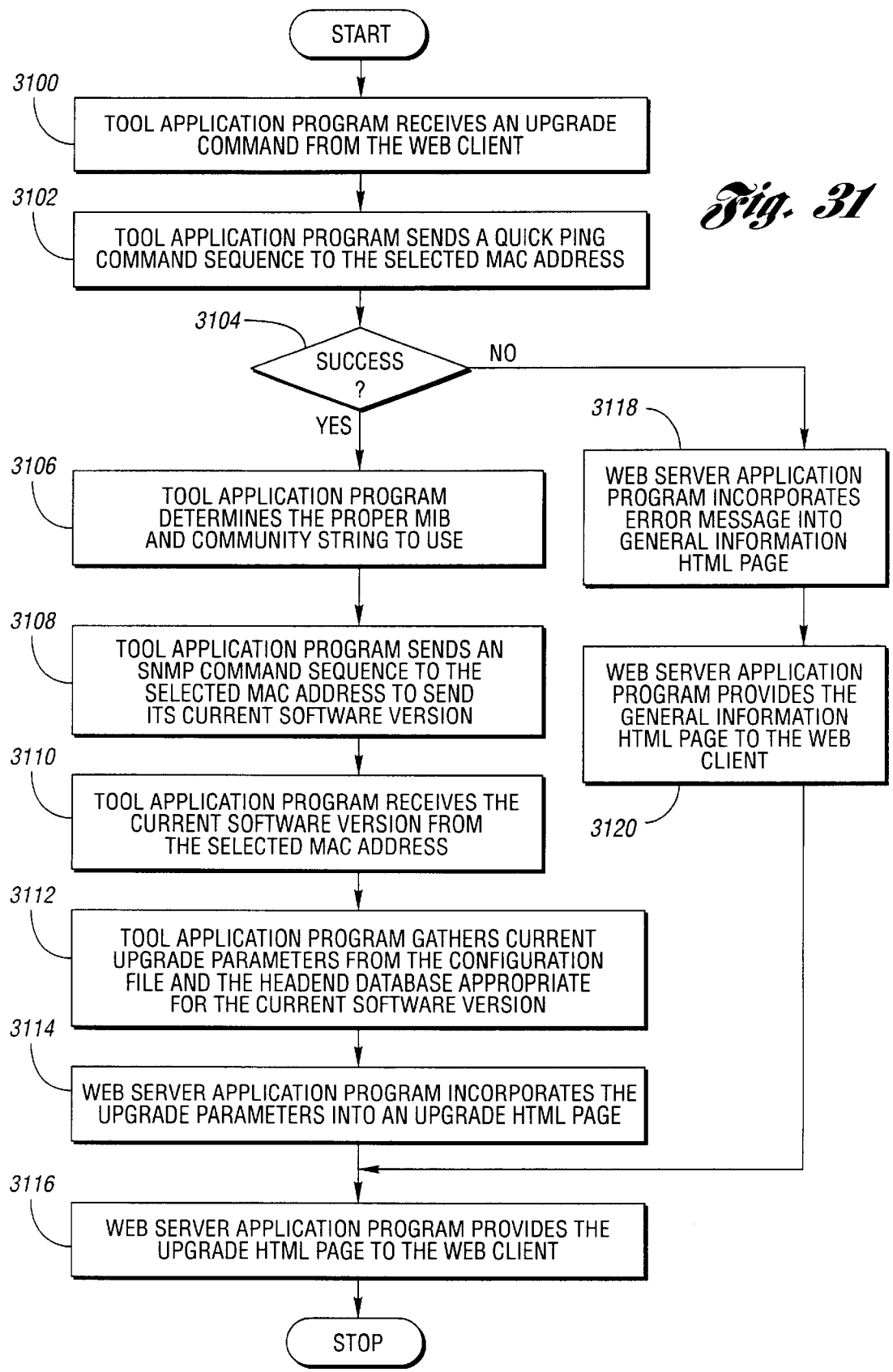
FIG. 31 is a flow diagram for displaying current upgrade parameters.
Figure 32:
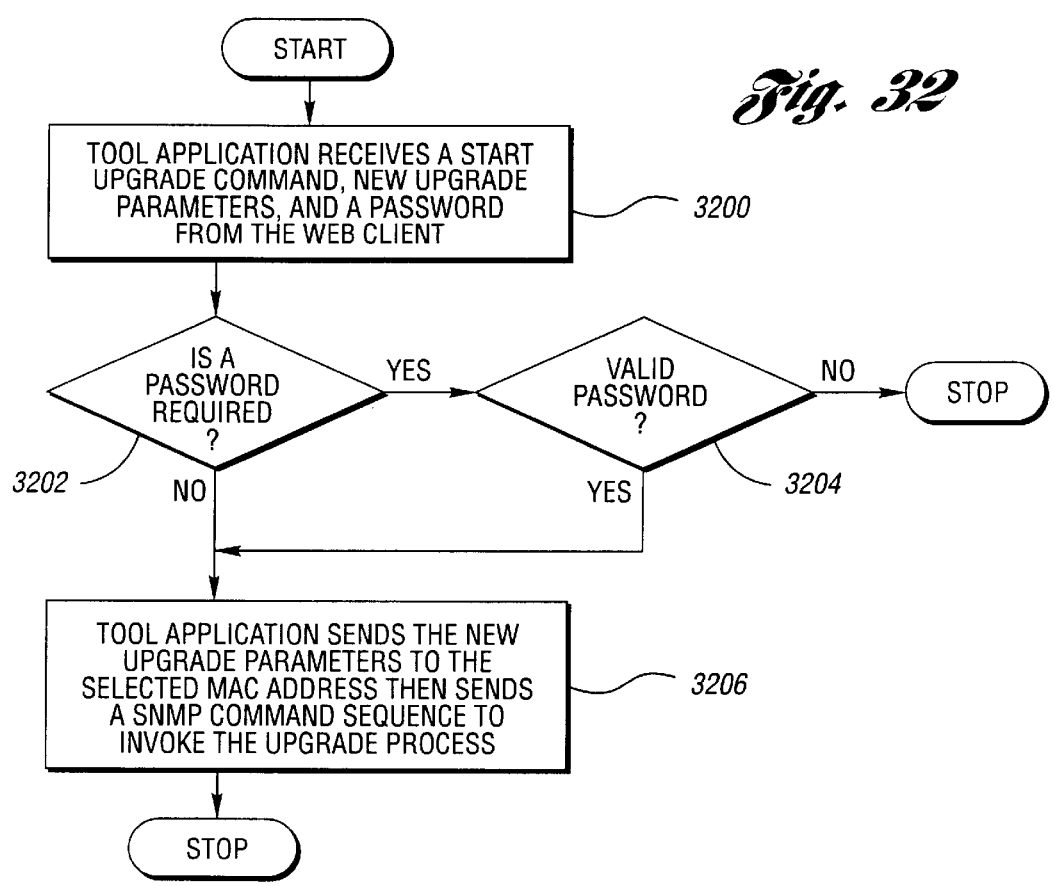
FIG. 32 is a flow diagram of a start upgrade command function.

FIG. 30 is an example of an upgrade page 3000, FIG. 31 is a flow diagram that established the default settings for the upgrade page 3000, and FIG. 32 is a flow diagram to initiate a software upgrade. The upgrade function is a way of initiating a software download for the selected MAC address 601. This function requires that the customer networks have been entered into the headend database 216. Referring to FIG. 30 and FIG. 31, the function starts upon the receipt of an upgrade command, block 3100. A quick ping command sequence is initiated, block 3102 to determine if the selected MAC address 601 is alive. If the quick ping is successful, as shown in decision block 3104, then the proper MIB and community strings are determined, block 3106. Tool application program 200 sends an SNMP command sequence for the selected MAC address 601 to send its current software version, as shown in block 3108. The current software version determines the next version to upgrade to. The current software version is received as shown in block 3110. Tool application program 200 then gathers the TFTP server IP address 3002 (see FIG. 30), gateway address to the customer's network 3004, and download file name 3006 from the configuration file 202 and the headend database 216, block 3102. The web server application program 206 incorporates the information into the upgrade page 3000, as shown in block 3114, and provides it to the web client 208, shown in block 3116. Where decision block 3104 determines that the quick ping was not successful, an error message in added to the general information page 600, as shown in block 3118. Afterwards, web sever application program 206, provides the general information page 600 to the web client 208, as shown in block 3120.

FIG. 32 is a flow diagram of the upgrade function after the web client 208 has verified the upgrade parameters, and has entered a password 3008 in FIG. 30 if the selected MAC address 601 is that of a headend node. The upgrade function starts with the receipt of the start upgrade command, the new upgrade parameters 3002–3006, and possibly a password 3008, as shown in block 3200. If the selected MAC address 601 is for a headend node, for example a LANCity, Inc. model LCh, then a password 3008 is required, decision block 3202. When a password 3008 required, the tool application program 200 then determines if the password 3008 entered is valid, decision block 3204. The tool application program 200 then sends the new upgrade parameters to the selected MAC address 601, followed by an SNMP command sequence to invoke the upgrade process, block 3206. The actual time required to download the new software filed from the TFTP server will vary depending on noise and other traffic on the network, and the workload of the TFTP server. The ping function should be used after a suitable amount of time has passed to see if the selected MAC address 601 has completed the upgrade and is back on-line. If the upgrade fails for any reason, the device at the selected MAC address 601 usually requires replacement or a software download by another means.

Figure 34:
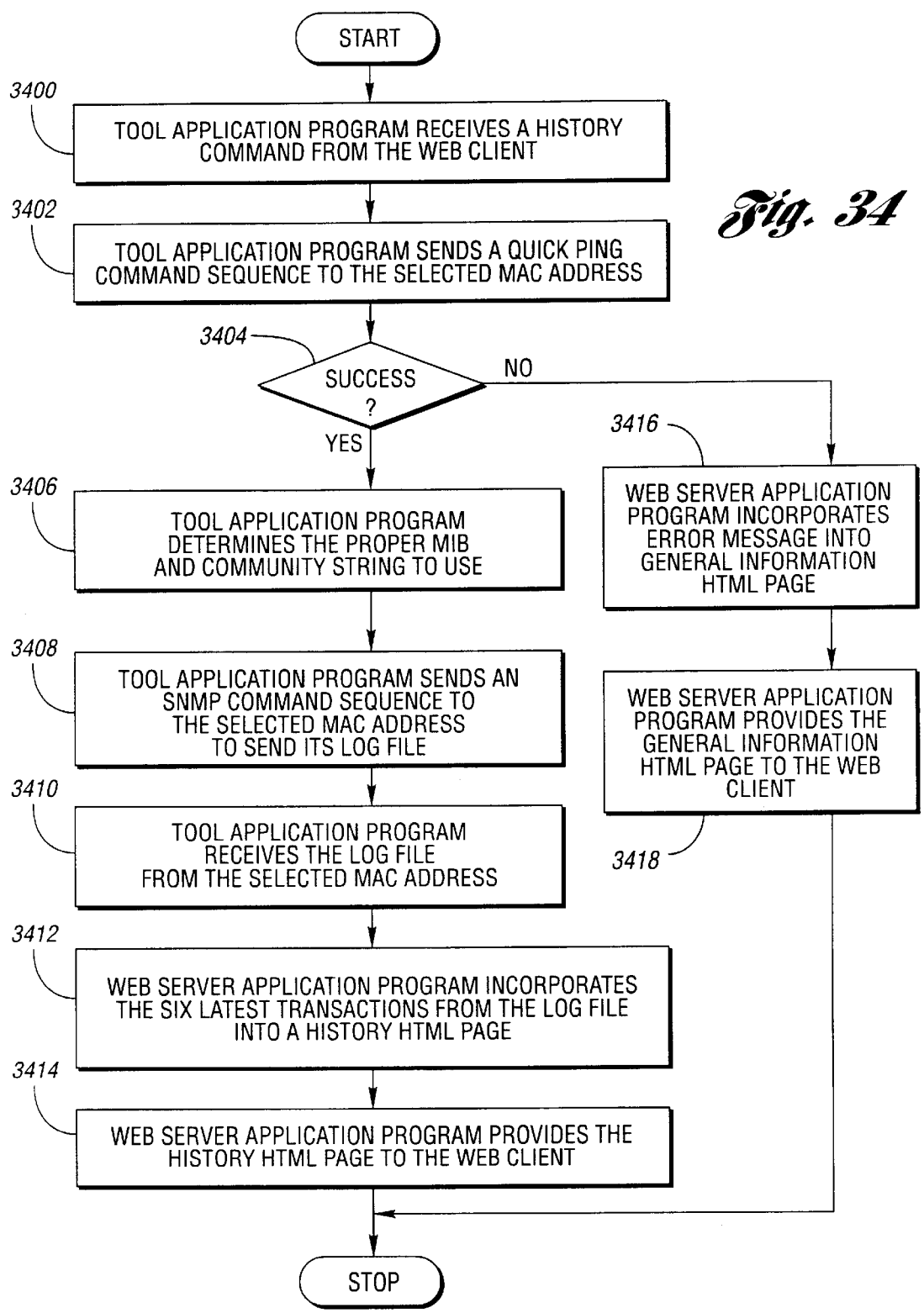
FIG. 34 is a flow diagram of a history command function.

FIG. 33 is an example of a history page 3300 and FIG. 34 is the associated flow diagram for the history function. The history function starts with the receipt of a history command, block 3400. A quick ping is sent, block 3402, and the success of the quick ping determined, decision block 3404. If the quick ping was successful, the proper MIB and community strings are determined, as shown in block 3406. Next, tool application program 200 then sends an SNMP command sequence to the selected MAC address 601 requesting its log file, block 3508. After the tool application program 200 receives the log file, block 3510, the web server application program 206 incorporates the six latest transactions into the history page 3300, as shown in block 3412, and provides it to the web client 208, as shown in block 3414. If decision block 3404 fails the quick ping, then an error message is added to the general information page 600, as shown in block 3416. Finally, the web server application program 206 provides the general information page 600 to the web client 208, as shown in block 3418.

Figure 35:
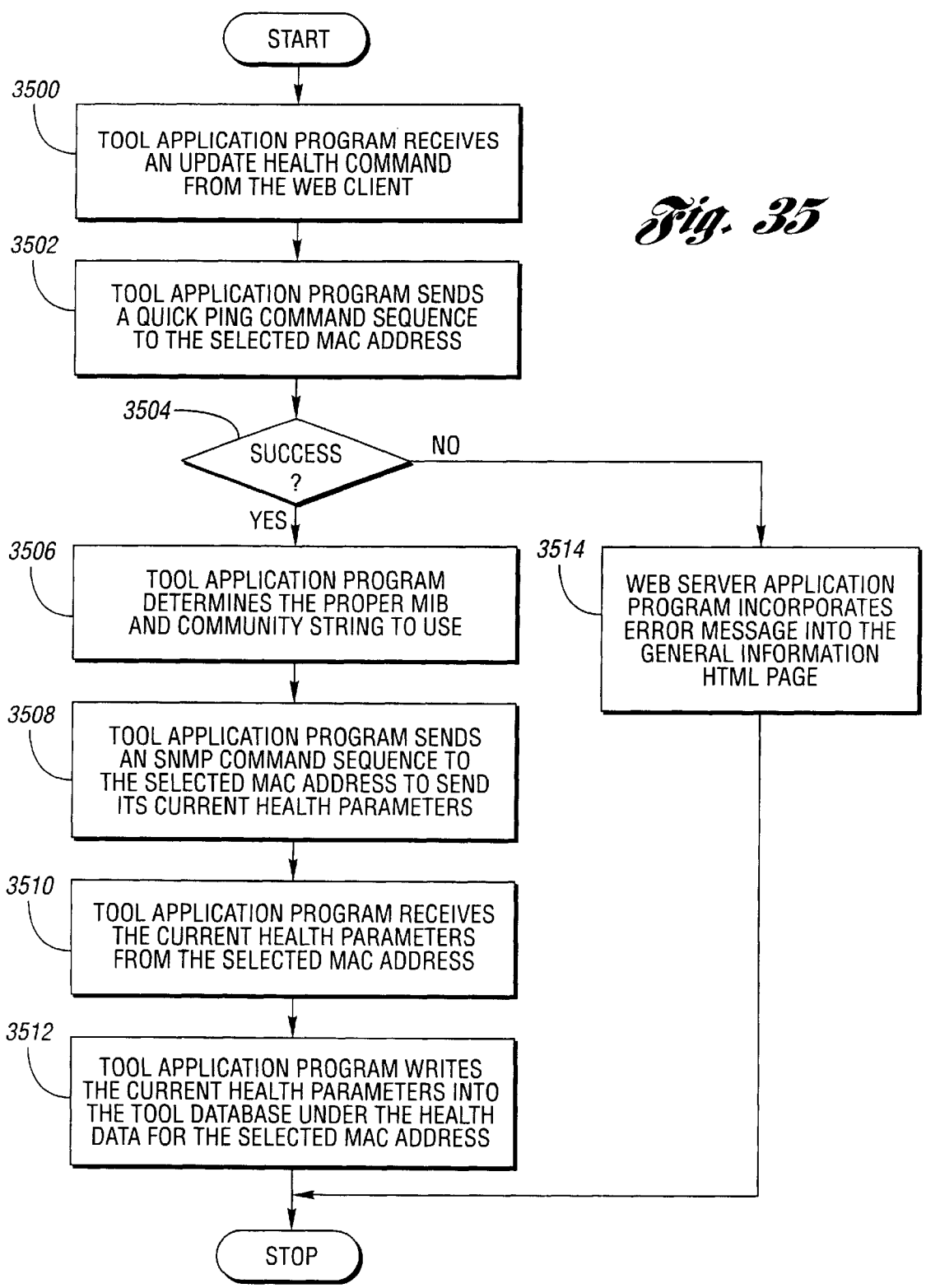
FIG. 35 is a flow diagram of an update health command function.

FIG. 35 is a flow diagram for the update health command. The function starts with the receipt of the update health command from the web client 208, as shown in block 3500. Tool application program 3502 sends a quick ping command sequence to the selected MAC address 601, as shown in block 3502. If the quick ping is successful, decision block 3504, then the proper MIB and community strings are determined, block 3506. Tool application program 200 then sends an SNMP command sequence to the selected MAC address 601 to send its current health parameters, as shown in block 3508. After receiving the current health parameters from the selected MAC address 601, as shown in block 3510, the tool application program 200 writes the current health parameters into the tool database 204 under the selected MAC address 601, as shown in block 3512. If decision block 3904 falls the quick ping, then an error message is included in the general information page 600, as shown in block 3514.

Figures 36, 37:
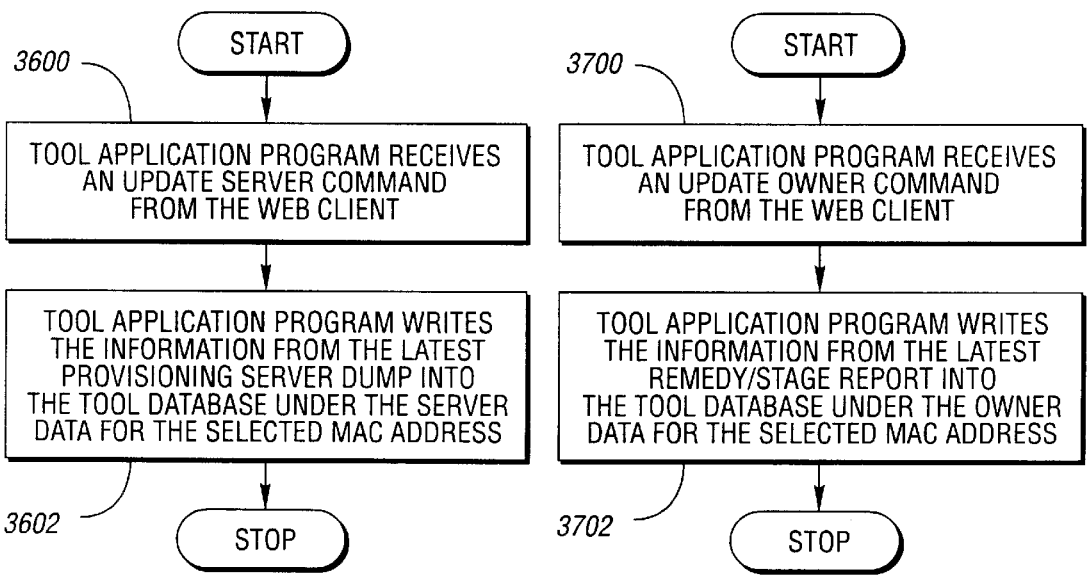
FIG. 36 is a flow diagram of an update server command function.
FIG. 37 is a flow diagram of an update owner command function.

FIG. 36 is a flow diagram for the update server command. The function starts with the receipt of an update server command from the web client 208, as shown in block 3600. Tool application program 200 writes the information from the latest provisioning server 214 dump into the tool database 204 under the selected MAC address 601, as shown in block 3602.

FIG. 37 is a flow diagram for the update owner command. The function starts with the receipt of an update owner command from the web client 208, as shown in block 3700. Tool application program 200 writes the information from the latest periodic (Stage or Remedy) report 218 into the tool database 204 under the selected MAC address 601, as shown in block 3702.

Figure 39:
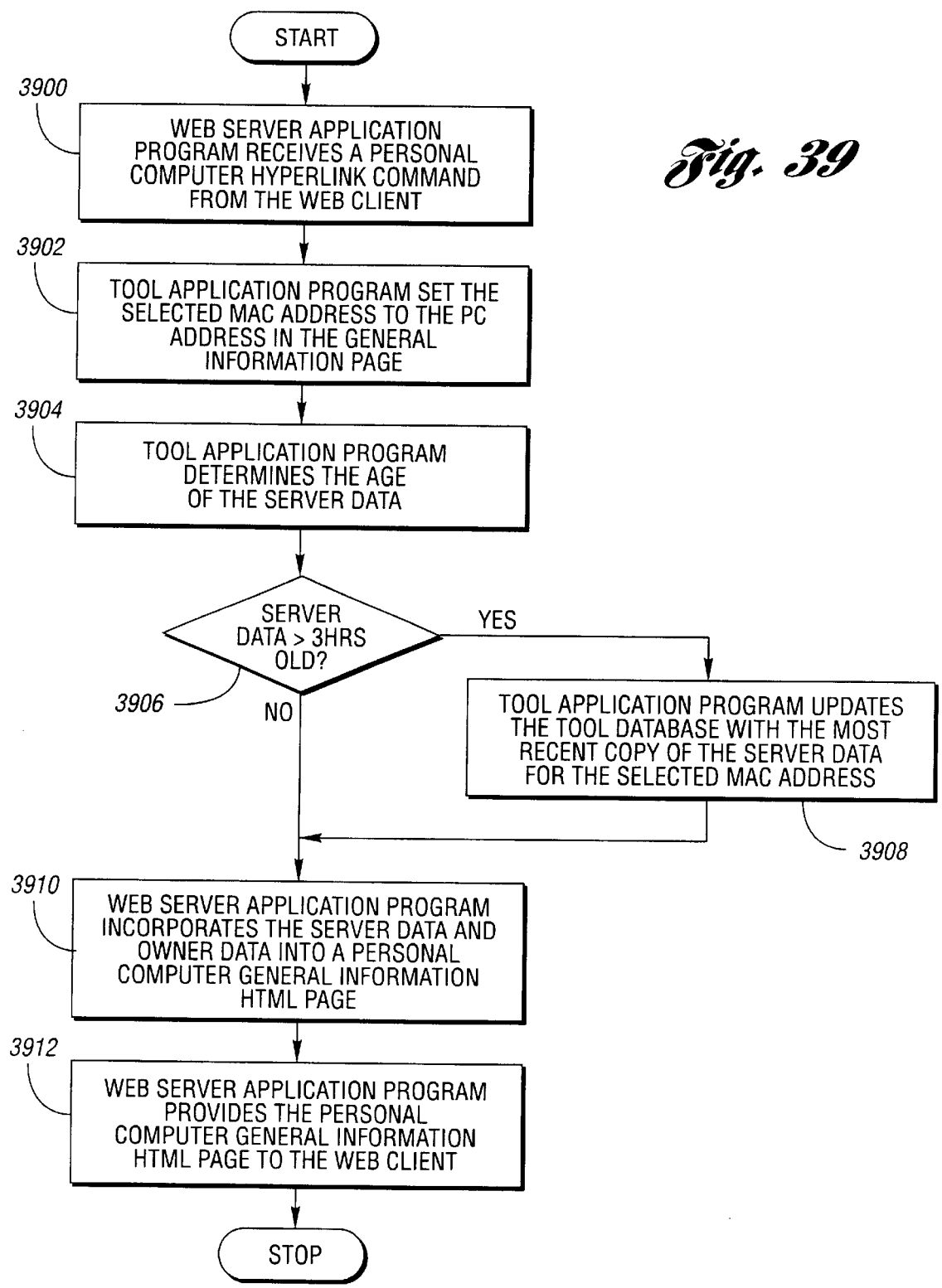
FIG. 39 is a flow diagram of a personal computer command function.

Referring back to FIG. 6, three hyperlinks are provided in the general information page 600, one to show more information about the customer's PC on the Ethernet side of a cable modem, a second to an e-mail page, and a third to more information about the headend reference node. FIG. 38 is an example of a personal computer general information page 3800 and FIG. 39 is the associated flow diagram. FIG. 38 shows the sever data 3802 and owner data 3804 for the selected PC MAC address 612. However, in this example, the network interface card for the selected PC does not respond to SNMP commands. Consequently there is no health data or software version data to display, and the Alive? status 3806 is NO.

FIG. 39 is a flow diagram of the process for obtaining the information for the PC general information page 3800. The process starts when the web server application program 206 receives the PC hyperlink command from the web client 208, as shown in block 3900. Tool application program 200 sets the selected MAC address 601 to the PC MAC address 612, shown in block 3902. Tool application program 200 then determines the age of the server data, as shown in block 3904. If the server data is over 3 hours hold, decision block 3906, then the tool application program 200 updates the tool database 204 with the most recent provisioning server dump of the server data, as shown in block 3908. Next, the web server application program 206 incorporates the server data and owner data into a personal computer general information page 3800, as shown in block 3910. The personal computer general information page 3800 is then provided to the web client 208, as shown in block 3912.

Figure 40:
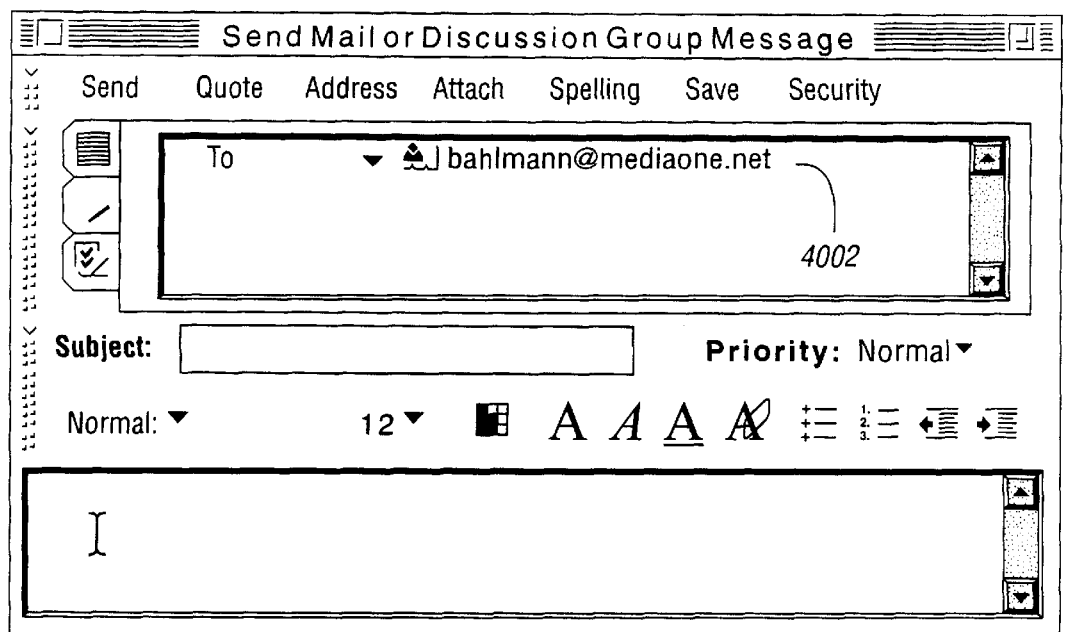
FIG. 40 is an example of an e-mail page display.
Figure 41:
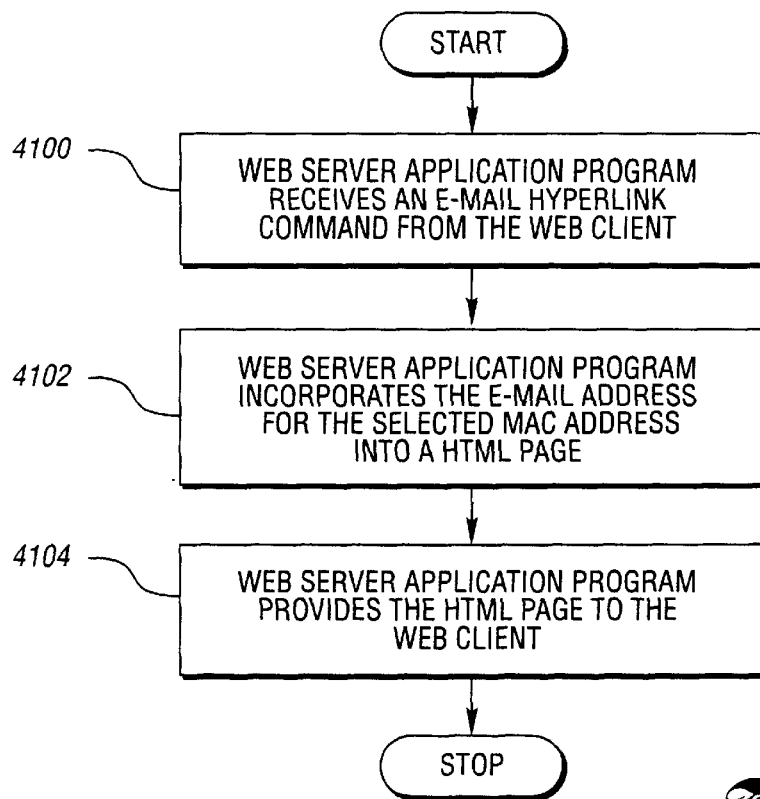
FIG. 41 is a flow diagram of an e-mail command function.

The second hyperlink is to an e-mail page 4000, shown in FIG. 40. Referring to FIG. 41, the e-mail function starts when the web server application program 206 receives an e-mail hyperlink command from the web client 208, shown in block 4100. Next the web server application program 206 incorporates the e-mail address (a hostname and domain name) into the "To" field 4002 of the e-mail page 4000, as shown in block 4102. Finally, the e-mail page 4000 is provided to the web client 208, as shown in block 4104.

The third hyperlink is to a headend reference node page 4200, shown in FIG. 42, for the headend reference node serving the selected MAC address 601 shown in the general information page 600 from FIG. 6. Headend reference node page 4200 includes the server data 4202 and health data 4204. Customers do not own headend reference nodes so owner data is not displayed. Referring to FIG. 43, the function starts with the receipt of a headend reference node hyperlink command from the web client 208, as shown in block 4300. The tool application program 200 then sets the selected MAC address 601 to the headend reference node's MAC address, block 4302, and obtains the server data and health data for the headend reference node from the tool database 204, as shown in block 4304. The tool application program 200 then determines the age of the server data, block 4306. If the server data is over 3 hours old, decision block 4308, then the tool database 204 is updated, as shown in block 4310. The web server application program 206 incorporated the server data and the owner data into a headend reference node page 4200, as shown in block 4312. Finally, the headend reference node page 4200 is provided to the web client 208, as shown in block 4314.

Most of the page displays also contain a Back to Display button and a New Search button. The Back to Display button causes the general information display page 600 to be displayed to the web client 208. The New Search button causes the search page 300 to be displayed.

Another element of the present invention mentioned briefly in FIG. 2 is the configuration file 202. This file provides the tool application program 200, and any other web-based application running on the host computer 100a with global information about the provisioning system currently in use. When one or more of the global parameters require modification, it can be accomplished at the configuration file 202 without having to modify the code of the tool application program 200 and all of the other web applications. Note that adding to the configuration file 202 does not automatically propagate the new values to remote machines. Merely adding Network Information Service names (a Sun Microsystems application that provides information to all machines in a network) and IP addresses of the remote servers to the configuration file does not enable the remote procedure calls this file defines. Any remote machines defined in the configuration file 202 must also be configured to allow the user running the web server application program 206 to access its resources and execute certain programs. Examples of the types of information that may be found in the configuration file 202 are provided in table 8 through table 15.

TABLE 8

Remote Machine Interface Names

| Variable | Description | Suggested Values | Restrictions |
|---|---|---|---|
| $bootpip | IP address of BOOTP server | x.x.x.x | |
| $bootpserver | NIS name of BOOTP server | bootp | no spaces or "." |
| $bootptype | BOOTP server type | join * | no spaces |
| $bootpversion | BOOTP version | x | integer |
| $dhcpip | IP address of DHCP server | x.x.x.x | |
| $dhcpserver | NIS name of DHCP server | dhcp | no spaces or "." |
| $dhcptype | DHCP server type | join * | |
| $dhcpversion | DHCP version | x | integer |
| $use_dns_file | Turns on/off use of dns file | x | 0 = off, 1 = on |
| $dnsip | DNS IP address | x.x.x.x | |
| $dnssever | DNS server name | dnsname | no spaces or "." |
| $tftppip | TFTP server IP address | x.x.x.x | |
| $tftpname | TFTP server name | tftpname | no spaces or "." |
| $tftptype | TFTP server type | solaris | no spaces |
| $tftpversion | TFTP version | x | integer |
| $secure_tftp | TFTP secure | x | 0 = on, 1 = off |
| $routable_hrns | Gateway of 24Net for headend reference nodes (else 10Net) | x | 0 = no, 1 = yes |
| $tftphome | TFTP home directory | /tftproot | |

* "join" is a server supplied by Join System's, Inc.

TABLE 9

Global CGI Definitions

| Variable | Description | Suggested Values | Restrictions |
|---|---|---|---|
| $defaultdomain | Domain for region | <region>\.mediaone\.net | two letter designation |
| $webmaster | Primary web support person | <name>\@mediaone\.net | no spaces or "." |
| $backdoor | Password override | at least 8 characters | don't use special |

TABLE 9-continued

Global CGI Definitions

| Variable | Description | Suggested Values | Restrictions |
|---|---|---|---|
| $upgradepassword | Upgrade password | at least 8 characters | characters don't use special characters |
| $provisioning password | Register/De-register password | at least 8 characters | don't use special characters |
| $usefile | Use files instead of rsh'ing to provision server | yes | yes/no |
| $reset_nodes | Enable reset of headend reference node | x | 0 = no, 1 = yes |
| $additional_messages | Additional message to display on search page | string | |
| $dns_flag | Require "-" in gw dns | x | 0 = ignore, 1 = require |
| $status_flag | Enables logging of search hits in status.log | 1 | |

TABLE 10

SNMP Community Strings

| Variable | Description | Suggested Value | Restrictions |
|---|---|---|---|
| $lcpread | Read string for dynamics | public | escape control characters and use all lower case |
| $lcpwrite | Write string for dynamics | secrete | Same as above |
| $lchread | Reads string for statics | secrete | Same as above |
| $lchwrite | Write string for statics | secrete | Same as above but unique to all |
| $lcptrap | Trap string for dynamics | "none" | |
| $lchtrap | Trap string for statics | "none" | |

TABLE 11

Miscellaneous

| Variable | Description | Suggested Values | Restrictions |
|---|---|---|---|
| $testswitch | Turn off/on remote procedure calls | x | on/off |
| $prohibit_owner_data | Limits viewing of owner data respectively | z.z.x.x | "x" is a wildcard |
| $cmts_version | Cable modem termination system software version | x.xx | |
| $cm_version | Cable modem software version | x.xx | |
| $sm_sw_dir | Location of software updates | /sw | |
| $xmit_max | Max normal transmit level | xx | |
| $xmit_min | Min normal transmit level | xx | |
| $xrcv_max | Max normal receive level | xx | |
| $xrcv_min | Min normal receive level | xx | |
| $pktloss_max | Max acceptable packet loss | x.xx | |

TABLE 12

Data Path Definitions

| Variable | Description | Suggested Values | Restrictions |
|---|---|---|---|
| $webpath | web server's home directory | /web | use symbolic link if other than/web |
| $optjoin | Command directory | /opt/join * (default) | none |
| $etcjoin | Configuration directory | /etc/join * (default) | none |
| $binjoin | Script directory | /opt/join/bin * | none |
| $webjoin | Web scripts directory | /opt/join/bin/webscripts * | owned by users "nobody" |
| $traceroute | Traceroute path | /opt/VJtr/bin/tracetroue | |
| $commonpath | Common path | /$webpath/userdb/Common | |
| $tfphome | TFTP home directory | /usr/tftp (default) | none |
| $hpapath | HPA script home on web server | /web/userb/Provisioning | no exceptions |
| $md5spath | MD5 scripts directory | /web/userdb/Provisioning/md5s | no exceptions |
| $snmppath | SNMP commands directory | /usr/local/bin (default) | none |
| $toolspath | HSDTOOLS directory | /web/userdb/hsdtools | no exceptions |

TABLE 12-continued

Data Path Definitions

| Variable | Description | Suggested Values | Restrictions |
|---|---|---|---|
| $web1 | 1st copy of dhcpcap | $etcjoin/dhcpcap.web1 * | generated file |
| $web2 | 2nd copy of dhcpcap | $etcjoin/dhcpcap.web2 * | generated file |
| $dnsfile | DNS for HE nodes | $etcjoin/henodes.dns * | generated file |
| $netmasks | Netmasks file for Join | $etcjoin/netmasks.suggested * | generated file |

* "join" is a server supplied by Join Systems, Inc.

TABLE 13

Data Locations

| Variable | Description | Suggested Values | Restrictions |
|---|---|---|---|
| $customers | Remedy/Stage data file | $toolspath/hsd-dns | transferred nightly from Remedy/Stage |
| $dnsnames | Remedy/Stage hostname | $toolspath/dnsname.dat | transferred nightly from Remedy/Stage |
| $healthpath | Directory for stored SNMP info for modems | $hsdtools/healthdata | none |
| $ownerpath | Directory for stored owner info for cable modems/PC's | $hsdtools/ownerdata | none |
| $serverpath | Directory for stored server info for cable modems/PCs | $hsdtools/serverdata | none |
| $hpa_display_switch | Display by city of physical location | city | |
| $bootpcap | BOOTP server specific dhcpcap file | $hpapath/bootpcap | generated file |
| $bootfile | Service level definitions (web dropdown list) | $hpapth/bootfile | see file bootpfile.format |
| $bootpnetmasks | Netmasks for BOOTP server | $hpapth/netmasks.bootp | generated file |
| $cityfile | Listing of possible cities (web dropdown list) | $hpapath/city | 1 per line |
| $dhcpcap | DHCP server specific dhcpcap file | $hpapath/dhcpcap | generated file |
| dhcpnetmasks | Netmasks for DHCP server | $hpapath/netmasks.dhcp | generated file |
| $frequency | Not Currently Used | $hpapath/freq | 1 per line |
| $headendfile | Listing of all headends (web dropdown list) | $hpapath/headend | 1 per line |
| $henodes | Flat file database of HPA | $hpapath/dhcpcap.dat | generated file |
| $henodesdns | Listing of DNS entries for headend nodes | $hpapath/henodes.dns | generated file |
| $newcap | Temp file for DNS entries | $hpapath/newcap | generated file |
| $nodefile | Listing of possible nodes (web dropdown list) | $hpapath/node | 1 per line |
| $statefile | Listing of possible states | $hpapath/state | 1 per line |

TABLE 14

Local Processes

| Variable | Description | Suggested Values | Restrictions |
|---|---|---|---|
| $datecommand | Obtain date from server | /usr/bin/date | none |
| $pingcommand | Execute Ping command | /usr/sbin/ping | none |

TABLE 15

Remote Processes

| Variable | Description | Suggested Values | Restrictions |
| --- | --- | --- | --- |
| $exec_dhcp | Executive program DHCP server | rsh $dhcpserver | ""if application is on co-hosted with web server |
| $exec_bootp | Executive program on BOOTP server | rsh $bootpserver | ""if application is on co-hosted with web server |
| $datecommandr | Time/Date of DHCP server | rsh $dhcpserver /usr/bin/date | remove rsh portion for web server co-hosted with dhcpserver |
| $jdbdumpcommand | Database dump of DHCP server-readable | rsh $dhcpserver $optjoin/jdbdump - a * | same as above |
| $jdbdumpcommand2 | Database dump of BOOTP server-readable | rsh $bootpserver $optjoin/jdbdump - a * | same as above |
| $jdbdumpxcommand | Database dump of DHCP server | rsh $dhcpserver $optjoin/jdbdump - a * | same as above |
| $jdbdumpxcommand2 | Database dump of BOOTP server | rsh $bootpserver $optjoin/jdbdump - a * | same as above |
| $jdbregcommand | Dump register of DHCP server | rsh $dhcpserver $optjoin/jdbreg.keep- s * | same as above (jdbreg.keep is a copy of jdbreg with Set UID) |
| $jdbregcommand2 | Dump register of BOOTP server | rsh $bootpserver $optjoin/jdbreg - s * | same as above (jdbreg has UID set) |
| $lasttransaction | Parse DHCP server log by device | rsh $dhcpserver $binjoin/lasttrans * | |
| $lasttransaction2 | Parse BOOTP server log by device | rsh $bootpserver $binjoin/lasttrans | |
| $jdbrega | Add a MAC address to the DHCP server | rsh $dhcpserver $webjoin/jdbrega.csh * | $jdbrega <MAC> |
| $jdbrega2 | Add a MAC address to the BOOTP server | rsh $bootpserver $webjoin/jdbrega.csh * | $jdbrega <MAC> |
| $jdbregd | Remove a MAC address from the DHCP server | rsh $dhcpserver $webjoin.jdregd.csh * | $jdbregd <MAC> |
| $jdbregd2 | Remove a MAC address from the BOOTP server | rsh $bootpserver $webjoin.jdregd.csh * | $jdbregd <MAC> |
| $jdbregda | Remove and Add a MAC address from the DHCP server | rsh $dhcpserver $webjoin.jdregda.csh * | $jdbregda <MAC> <MAC> |
| $jdbregda2 | Remove and Add a MAC address from the BOOTP server | rsh $bootpserver $webjoin.jdregda.csh * | $jdbregda <MAC> <MAC> |
| $jdbregr | Re-register a MAC address to the DHCP server | rsh $dhcpserver $webjoin/jdbregr.csh * | $jdbregr <MAC> |
| $jdbregr2 | Re-register a MAC address to the BOOTP server | rsh $bootpserver $webjoin/jdbregr.csh * | $jdbregr <MAC> |
| $jdbregs | List MAC address(es) to the DHCP server | rsh $dhcpserver $webjoin/jdbregs.csh * | $jdbregs |
| $jdbregs2 | List MAC address(es) to the BOOTP server | rsh $bootpserver $webjoin/jdbregs.csh * | $jdbregs |

* "join" is a server provided by Join System, Inc.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system to enable a client on a network to troubleshoot a plurality of medium access control addresses on the network, wherein the network has at least one provisioning server having server data directed to the plurality of medium access control addresses, and wherein the network has at least one periodic report having owner data directed to the plurality of medium access control addresses and a headend database having network configuration data available to the system, the system comprising:

a computer having an interface to the network;

a tool database hosted by the computer and containing health data, the owner data, and the server data for each medium access control address of the plurality of medium access control addresses;

a tool application program executed by the computer, the tool application program being in communication with the tool database, the client, the plurality of medium access control addresses, the at least one provisioning server, and the headend database; and a server application program executed by the computer, the server application program providing a set of standard protocols to facilitate the tool application program communications, storage of a most recent copy of the owner data from the at least one periodic report, and storage of a most recent copy of the server data from the at least one provisioning server;

wherein upon receipt of at least one search parameter from the client, the tool application program is operative to search the tool database and headend database for a match to the at least one search parameter, identify a selected medium access control address of the plurality of medium access control addresses associated with the match, and provide to the client a general information page containing the server data, the owner data and the health data stored in the tool database under the selected medium access control address;

wherein upon receipt of an update health command from the client, the tool application program is operative to obtain a plurality of current health parameters from the selected medium access control address, and update the tool database with the plurality of current health parameters;

wherein upon receipt of an update owner command from the client, the tool application program is operative to update the tool database with the most recent copy of the owner data having the selected medium access control address; and wherein upon receipt of an update server command from the client, the tool application program is operative to update the tool database with the most recent copy of the server data having the selected medium access control address.

2. The system of claim 1 wherein the at least one search parameter is selected from a group of search parameters comprising a medium access control address, an Internet Protocol address, a hostname, a character string, a city, a personal computer, a cable modem, a headend node, and a fiber node.

3. The system of claim 1 wherein the tool application program is operative to obtain an uptime status from the at least one provisioning server and provide the uptime status to the client.

4. The system of claim 1 wherein a plurality of matches are found for the at least one search parameter, the tool application program is operative to provide the client with a first pick list page containing the plurality of matches, and receive back the match selected by the client from the plurality of matches.

5. The system of claim 1 wherein a plurality of medium access control addresses associated with the match are identified, the tool application program is operative to provide the client with a second pick list page containing the plurality of medium access control addresses, and receive back the selected medium access control address selected by the client from the plurality of medium access control addresses.

6. The system of claim 1 wherein upon identification of the selected medium access control address, the tool application program is operative to send a quick ping command sequence to the selected medium access control address, check for a quick ping response from the selected medium access control address, and incorporate in the general information page an alive status determined by the quick ping response.

7. The system of claim 1 wherein upon receipt of a bridging table command from the client, the tool application program is operative to obtain a bridge forwarding table from the selected medium access control address, and provide the bridge forwarding table to the client.

8. The system of claim 1 wherein upon receipt of a clear error command from the client, the tool application program is operative to send a clear error command sequence to the selected medium access control address, obtain a plurality of current health parameters from the selected medium access control address, and update the tool database with the plurality of current health parameters.

9. The system of claim 1 wherein upon receipt of a de-register command from the client, the tool application program is operative to send a de-registration request for the selected medium access control address to the at least one provisioning server.

10. The system of claim 1 wherein upon receipt of a registration command from the client, the tool application program is operative to send a registration request for the selected medium access control address to the at least one provisioning server.

11. The system of claim 1 wherein upon receipt of an address filter command from the client, the tool application program is operative to obtain a plurality of current address filter parameters from the selected medium access control address, and provide the plurality of current address filter parameters to the client.

12. The system of claim 11 wherein upon receipt of a set address filter command and a plurality of new address filter parameters from the client, the tool application program is operative to send the plurality of new address filter parameters to the selected medium access control address.

13. The system of claim 11 wherein upon receipt of a clear address filter command from the client, the tool application program is operative to send a clear address filter command sequence to the selected medium access control address.

14. The system of claim 1 wherein upon receipt of a listen command from the client, the tool application program is operative to search a communication log file in the at least one provisioning server to produce a result based upon transactions involving the selected medium access control address, and provide the result to the client.

15. The system of claim 1 wherein the network includes a domain name server, and wherein upon receipt of a name server lookup command from the client, the tool application program is operative to determine a selected Internet Protocol address for the selected medium access control address, obtain a hostname for the selected Internet Protocol address from the domain name server, and provide the hostname to the client.

16. The system of claim 1 wherein upon receipt of a ping command from the client, the tool application program is operative to send a ping command sequence to the selected medium access control address, check for a ping response from the selected medium access control address after the ping command sequence is sent, and provide a ping result page to the client based upon the ping response.

17. The system of claim 1 wherein upon receipt of a port filter command from the client, the tool application program is operative to obtain a plurality of current port filter parameters from the selected medium access control address, and provide the plurality of current port filter parameters to the client.

18. The system of claim 17 wherein upon receipt of an apply port filter command and a plurality of new port filter parameters from the client, the tool application program is operative to send the plurality of new port filter parameters to the selected medium access control address.

19. The system of claim 1 wherein upon receipt of a reset command from the client, the tool application program is operative to send a reset command sequence followed by a quick ping command sequence to the selected medium access control address, check for a quick ping response, and provide a reset result page to the tile client based upon the quick ping response.

20. The system of claim 1 wherein upon receipt of an upgrade command from the client, the tool application program is operative to provide a plurality of current upgrade parameters to the client.

21. The system of claim 20 wherein upon receipt of a start upgrade command and a plurality of new upgrade parameters from the client, the tool application program is operative to send the plurality of new upgrade parameters to the selected medium access control address.

22. The system of claim 1 wherein the general information page includes a personal computer medium access control address, and wherein upon receipt of a personal computer command from the client, the tool application program is operative to provide to the client a personal computer general information page containing the server data and the owner data as stored in the tool database under the personal computer medium access control address.

23. The system of claim 1 wherein upon receipt of an e-mail command from the client, the server application program is operative to provide an e-mail page to the client.

24. The system of claim 1 wherein the general information page includes a headend reference node medium access control address, and wherein upon receipt of a headend reference node command from the client, the tool application program is operative to provide to the client a headend reference node information page containing the server data and the health data as stored in the tool database under the headend reference node medium access control address.

25. The system of claim 1 wherein upon receipt of a history command from the client, the tool application program is operative to obtain a log file from the selected medium access control address and provide the log file to the client.

26. The system of claim 1 further comprising a configuration file that provides a plurality of global parameters to the tool application program.

27. The system of claim 1 further comprising a browser having an interface to the network, the browser facilitating communications between the client and the server application program.

28. The system of claim 1 further comprising a script application between the tool application program and the server application program to facilitate communications between the tool application program and the server application program.

29. A method to enable a client on a network to troubleshoot a plurality of medium access control addresses on the network, wherein the network has at least one provisioning server having server data directed to the plurality of medium access control addresses, and wherein the network has available at least one periodic report having owner data directed to the plurality of medium access control addresses and a headend database having network configuration data, the method comprises:

providing a tool database containing health data, the owner data from the at least one periodic report, and the server data from the at least one provisioning server, the tool database being organized by the plurality of medium access control addresses;

searching the tool database and the headend database for a match to at least one parameter in response to receiving the at least one search parameter from the client;

identifying a selected medium access control address of the plurality of medium access control addresses associated with the match in response to obtaining the match;

providing a general information page to the client in response to identifying the selected medium access control address, the general information page containing the server data, the owner data, and the health data for the selected medium access control address;

obtaining a plurality of current health parameters from the selected medium access control address in response to receiving an update health command from the client;

writing the plurality of current health parameters into the tool database in response to obtaining the plurality of current health parameter from the selected medium access control address;

periodically receiving a most recent copy of the owner data from the at least one periodic report;

writing the most recent copy of the owner data for the selected medium access control address into the tool database in response to receiving an update owner command from the client;

periodically receiving a most recent copy of the server data from the at least one provisioning server;

writing the most recent copy of the server data for the selected medium access control address into the tool database in response to receiving an update server command from the client.

30. The method of claim 29 wherein the at least one search parameter is selected from a group of search parameters comprising a medium access control address, an Internet Protocol address, a hostname, a character string, a city, a personal computer, a cable modem, a headend node, and a fiber node.

31. The method of claim 29 further comprising:
obtaining an uptime status from the at least one provisioning server; and
providing the uptime status to the client in response to obtaining the uptime status.

32. The method of claim 29 where a plurality of matches for the at least one parameter are found, the method further comprises:
providing to the client a first pick list page containing the plurality of matches in response to finding the plurality of matches; and receiving the match selected by the client from the plurality of matches after providing the first pick list to the client.

33. The method of claim 29 where a plurality of medium access control addresses are identified, the method further comprises:

providing to the client a second pick list page containing the plurality of medium access control addresses in response to identifying the plurality of medium access control addresses; and receiving the selected medium access control address selected by the client from the plurality of medium access control addresses after providing the second pick list to the client.

34. The method of claim 29 further comprising:

sending a quick ping command sequence to the selected medium access control address in response to identifying the selected medium access control address;

checking for a quick ping response from the selected medium access control address after sending the ping command sequence; and incorporating in the general information page an alive status determined by the ping response after completing the check for the quick ping response.

35. The method of claim 29 further comprising:

obtaining a bridge forwarding table from the selected medium access control address in response to receiving a bridge table command from the client; and providing the bridge forwarding table to the client in response to obtaining the bridge forwarding table.

36. The method of claim 29 further comprising:

sending a clear error command sequence to the selected medium access control address in response to receiving a clear error command from the client;

obtaining a plurality of current health parameters from the selected medium access control address after sending the clear error command sequence to the selected medium access control address; and writing the plurality of current health parameters received from the selected medium access control address into the tool database in response to obtaining the plurality of current health parameters.

37. The method of claim 29 further comprising requesting the at least one provisioning server de-register the selected medium access control address in response to receiving a de-register command from the client.

38. The method of claim 29 further comprising requesting the at least one provisioning server register the selected medium access control address in response to receiving a register command from the client.

39. The method of claim 29 further comprising:

obtaining a plurality of current address filter parameters from the selected medium access control address in response to receiving an address filter command from the client; and providing the plurality of current address filter parameters to the client in response to obtaining the plurality of current address filter parameters.

40. The method of claim 39 further comprising sending a plurality of new address filter parameters to the selected medium access control address in response to receiving the plurality of new address filter parameters and a set address filter command from the client.

41. The method of claim 39 further comprising sending a clear address filter command sequence to the selected medium access control address in response to receiving a clear address filter command from the client.

42. The method of claim 29 further comprising:

searching a communication log file in the at least one provisioning server to produce a result based upon transactions involving the selected medium access control address in response to receiving a listen command from the client; and providing the result to the client after completing the search of the communication log file.

43. The method of claim 29 wherein the network includes a domain name server, the method further comprising:

determining a selected Internet Protocol address for the selected medium access control address in response to receiving a name server lookup command from the client;

obtaining a hostname for the selected Internet Protocol address from the domain name server in response to determining the selected Internet Protocol address; and providing the hostname to the client in response to obtaining the hostname from the domain name server.

44. The method of claim 29 further comprising:

sending a ping command sequence to the selected medium access control address in response to receiving a ping command from the client;

checking for a ping response from the selected medium access control address after the ping command sequence is sent to the selected medium access control address; and providing a ping result page to the client based upon the ping response after completing the check for the ping response.

45. The method of claim 29 further comprising:

obtaining a plurality of current port filter parameters from the selected medium access control address in response to receiving a port filter command from the client; and providing the plurality of current port filter parameters to the client in response to obtaining the plurality of current port filter parameters.

46. The method of claim 45 further comprising sending a plurality of new port filter parameters to the selected medium access control address in response to receiving the plurality of new port filter parameters and an apply port filter command from the client.

47. The method of claim 29 further comprising:

sending a reset command sequence to the selected medium access control address in response to receiving a reset command from the client;

sending a quick ping command sequence to the selected medium access control address after sending the device reset command;

checking for a quick ping response after sending the quick ping command sequence; and providing a reset result page to the client based upon the ping response after completing the check for the ping response.

48. The method of claim 29 further comprising:

providing a plurality of current upgrade parameters to the client in response to receiving an upgrade command from the client.

49. The method of claim 48 further comprising sending a plurality of new upgrade parameters to the selected medium access control address in response to receiving the plurality of new upgrade parameters and a start upgrade command from the client.

50. The method of claim 29 wherein the general information page includes a personal computer medium access control address, the method further comprising providing to the client a personal computer general information page containing the server data and the owner data for the personal computer medium access control address, in response to receiving a personal computer command from the client.

51. The method of claim 29 further comprising providing an e-mail page to the client in response to receiving an e-mail command from the client.

52. The method of claim 29 wherein the general information page includes a headend reference node medium access control address, the method further comprising providing to the client a headend reference node information page containing the server data and the health data for the headend reference node medium access control address, in response to receiving a headend reference node command from the client.

53. The method of claim 29 further comprising:

obtaining a log file from the selected medium access control address in response to receiving a history command from the client; and providing the log file to the client in response to obtaining the log fi from the selected medium access control address.

* * * * *

UNITED STATES PATENT AND TRADEMARK OFFICE
CERTIFICATE OF CORRECTION

PATENT NO.    : 6,393,478 B1
DATED         : May 21, 2002
INVENTOR(S)   : Bruce F. Bahlmann It is certified that error appears in the above-identified patent and that said Letters Patent is hereby corrected as shown below:

<u>Column 29,</u>
Line 24, delete "tile"

<u>Column 34,</u>
Line 11, delete "fi" and insert -- file --

Signed and Sealed this

Twenty-eighth Day of January, 2003

JAMES E. ROGAN
*Director of the United States Patent and Trademark Office*